United States Patent
Pelletier et al.

(10) Patent No.: US 9,253,802 B2
(45) Date of Patent: Feb. 2, 2016

(54) METHOD AND APPARATUS FOR RANDOM ACCESS IN MULTICARRIER WIRELESS COMMUNICATIONS

(71) Applicant: INTERDIGITAL PATENT HOLDINGS, INC., Wilmington, DE (US)

(72) Inventors: Ghyslain Pelletier, Laval (CA); Stephen E. Terry, Northport, NY (US); Paul Marinier, Brossard (CA); Guodong Zhang, Syosset, NY (US); Peter S. Wang, E. Setauket, NY (US); Jin Wang, Princeton, NJ (US); Shankar Somasundaram, Sunnyvale, CA (US); Jean-Louis Gauvreau, La Prairie (CA); Charles A. Dennean, Melville, NY (US); Erdem Bala, Farmingdale, NY (US); Afshin Haghighat, Ile-Bizard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/296,773

(22) Filed: Jun. 5, 2014

(65) Prior Publication Data
US 2014/0293915 A1    Oct. 2, 2014

Related U.S. Application Data

(63) Continuation of application No. 12/766,677, filed on Apr. 23, 2010, now Pat. No. 8,767,585.

(60) Provisional application No. 61/171,917, filed on Apr. 23, 2009, provisional application No. 61/172,076,
(Continued)

(51) Int. Cl.
*H04W 4/00*  (2009.01)
*H04J 3/06*  (2006.01)
(Continued)

(52) U.S. Cl.
CPC ........ *H04W 74/0833* (2013.01); *H04W 74/002* (2013.01)

(58) Field of Classification Search
CPC ... H04W 4/00; H04W 72/0406; H04W 74/08; H04W 74/0833; H04B 7/14
USPC ......... 370/329, 203–210, 328, 332, 349, 345, 370/350, 503, 509, 510, 512
See application file for complete search history.

(56) References Cited

U.S. PATENT DOCUMENTS 7,580,388 B2    8/2009  Kim
7,843,895 B2 *  11/2010 Park et al. .................... 370/350
(Continued)

FOREIGN PATENT DOCUMENTS

CN         10134070 A      1/2009
WO         2007/052971     5/2007
(Continued)

OTHER PUBLICATIONS

3rd Generation Partnership Project; LTE; Evolved Universal Terrestrial Radio Access (E-UTRA); Physical layer procedures (3GPP TS 36.213 version 8.6.0 Release 8); ETSI TS 136 213 V8.6.0 (Apr. 2009).
(Continued)

*Primary Examiner* — Hanh N Nguyen
(74) *Attorney, Agent, or Firm* — Volpe and Koenig, P.C.

(57) ABSTRACT

Methods and apparatus for random access in multicarrier wireless communications are disclosed. Methods and apparatus are provided for physical random access channel (PRACH) resource signaling, PRACH resource handling, preamble and PRACH resource selection, random access response (RAR) reception, preamble retransmission, and transmission and reception of subsequent messages. A method for maintaining an allowed multicarrier uplink (UL) random access channel (RACH) configuration set by adding an UL carrier to the allowed RACH configuration set provided that a triggering event occurs and performing a random access (RA) procedure using the allowed RACH configuration set. A method for sending data in multicarrier wireless communications by determining a set of available UL carriers and selecting an UL carrier from the set of available UL carriers.

26 Claims, 17 Drawing Sheets

Related U.S. Application Data filed on Apr. 23, 2009, provisional application No. 61/181,811, filed on May 28, 2009, provisional application No. 61/293,366, filed on Jan. 8, 2010, provisional application No. 61/303,937, filed on Feb. 12, 2010, provisional application No. 61/320,405, filed on Apr. 2, 2010.

(51) Int. Cl.
   *H04W 74/08* (2009.01)
   *H04W 74/00* (2009.01)

(56) References Cited

U.S. PATENT DOCUMENTS

| | | | |
|---|---|---|---|
| 7,961,700 | B2 | 6/2011 | Malladi et al. |
| 8,014,455 | B2 | 9/2011 | Kim et al. |
| 8,095,143 | B2 | 1/2012 | Amirijoo et al. |
| 8,243,657 | B2 * | 8/2012 | Park et al. ............ 370/328 |
| 8,493,917 | B2 * | 7/2013 | Meyer et al. ............ 370/328 |
| 2003/0133426 | A1 | 7/2003 | Schein et al. |
| 2008/0075043 | A1 | 3/2008 | Wang et al. |
| 2009/0088148 | A1 | 4/2009 | Chung et al. |
| 2010/0284376 | A1 * | 11/2010 | Park et al. ............ 370/336 |

FOREIGN PATENT DOCUMENTS

| | | |
|---|---|---|
| WO | 2008/051037 | 5/2008 |
| WO | 2009/047025 | 4/2009 |

OTHER PUBLICATIONS

3rd Generation Partnership Project; LTE; Evolved Universal Terrestrial Radio Access (E-UTRA); Physical layer procedures (3GPP TS 36.213 version 9.1.0 Release 9); ETSI TS 136 213 V9.1.0 (Apr. 2010).
3rd Generation Partnership Project; LTE; Evolved Universal Terrestrial Radio Access (E-UTRA) and Evolved Universal Terrestrial Radio Access Network (E-UTRAN); Overall description; Stage 2 (3GPP TS 36.300 version 8.8.0 Release 8); ETSI TS 136 300 V8.8.0 (Jul. 2009).
3rd Generation Partnership Project; LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8); ETSI TS 136 300 V8.12.0 (Apr. 2010).
3rd Generation Partnership Project; LTE; Evolved Universal Terrestrial Radio Access (E-UTRA) and Evolved Universal Terrestrial Radio Access Network (E-UTRAN); Overall description; Stage 2 (3GPP TS 36.300 version 9.2.0 Release 9); ETSI TS 136 300 V9.2.0 (Feb. 2010).
3rd Generation Partnership Project; LTE; Evolved Universal Terrestrial Radio Access (E-UTRA); Medium Access Control (MAC) protocol specification (3GPP TS 36.321 version 8.5.0 Release 8); ETSI TS 136 321 V8.5.0 (Apr. 2009).
3rd Generation Partnership Project; LTE; Evolved Universal Terrestrial Radio Access (E-UTRA); Medium Access Control (MAC) protocol specification (3GPP TS 36.321 version 9.1.0 Release 9); ETSI TS 136 321 V9.1.0 (Apr. 2010).
3rd Generation Partnership Project; LTE; Requirements for further advancements for Evolved Universal Terrestrial Radio Access (E-UTRA) (LTE-Advanced) (3GPP RS 36.913 version 9.0.0 Release 9); ETSI TR 136 913 V9.0.0 (Feb. 2010).
Catt, "Consideration on RACH in CA," 3GPP TSG RAN WG2 Meeting #69bis, R2-102066, Beijing, China (Apr. 12-16, 2009).
Ericsson, "Carrier aggregation in LTE-Advanced," TSG-RAN WG1 #53bis, R1-082468, Warsaw, Poland (Jun. 30-Jul. 4, 2008).
Ericsson, "Random access with carrier aggregation," 3GPP TSG-RAN WG2 #68, Tdoc R2-096754, Jeju, South Korea (Nov. 9-13, 2009).
Nokia Corporation et al., "RACH and carrier aggregation," 3GPP TSG-RAN WG2 Meeting #67bis; R2-095898; Miyazaki, Japan (Oct. 12-16, 2009).
Nokia Corporation et al., "Radio link failure open issues," 3GPP TSG-RAN WG2 Meeting #68; R2-096845; Jeju, South Korea (Nov. 9-13, 2009).
Panasonic, "The subframe behaviour before message 3," 3GPP TSG-RAN WG1 Meeting 56bis, R1-091164, Seoul, Korea (Mar. 23-27, 2009).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.6.0 (Mar. 2009).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.1.0 (Mar. 2010).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.5.0 (Mar. 2009).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.9.0 (Mar. 2010).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V9.2.0 (Mar. 2010).
ZTE, "Initial Uplink Access Procedure in LTE-Advanced," 3GPP TSG RAN WG1 Meeting #55bis, R1-090076 (Jan. 12-16, 2009).

* cited by examiner

METHOD AND APPARATUS FOR RANDOM ACCESS IN MULTICARRIER WIRELESS COMMUNICATIONS

CROSS REFERENCE TO RELATED APPLICATIONS

This application is a continuation of U.S. patent application Ser. No. 12/766,677 filed Apr. 23, 2010, which claims the benefit of U.S. Provisional Application No. 61/171,917 filed Apr. 23, 2009; U.S. Provisional Application No. 61/172,076 filed Apr. 23, 2009; U.S. Provisional Application No. 61/181,811 filed May 28, 2009; U.S. Provisional Application No. 61/293,366 filed Jan. 8, 2010; U.S. Provisional Application No. 61/303,937 filed Feb. 12, 2010; and U.S. Provisional Application No. 61/320,405 filed Apr. 2, 2010, the contents of which are hereby incorporated by reference herein.

FIELD OF INVENTION

This application is related to wireless communications.

BACKGROUND

In wireless communications a random access procedure may be used to assign dedicated radio resources to a wireless transmit/receive unit (WTRU). A dedicated radio resource may be, for example, a specific preamble or physical random access channel (PRACH) resource. The random access procedure may be either contention-free or contention-based, and may include the following features: preamble transmission; random access response (RAR) reception, in which the RAR contains a grant for an uplink (UL) transmission; transmission of message3 (msg3) for contention-based random access; and contention resolution for contention-based random access (for example, the WTRU may determine whether the random access (RA) procedure was successfully completed).

FIG. 1 shows an example of a random access procedure including a WTRU and an evolved Node-B (eNB). The WTRU transmits a random access preamble. Then, the eNB responds with a RAR. Next, the WTRU may transmit a scheduled transmission, for example, a msg3 transmission. Then, the eNB may perform contention resolution for contention-based random access and the WTRU may determine whether the random access procedure was successful.

A WTRU initiates a random access procedure when one of the following events occurs: initial access to the network when the WTRU has no established connection, that is from the radio resource control (RRC)_IDLE state; a RRC connection re-establishment procedure, random access-physical downlink control channel (RA-PDCCH) order; handover; downlink (DL) data arrival during RRC_CONNECTED state requiring a random access procedure; or UL data arrival during RRC_CONNECTED state requiring a random access procedure, known as a random access scheduling request, (RA-SR).

In some wireless communications systems, such as, for example, Long Term Evolution (LTE), a WTRU may initiate a random access procedure due to one of the aforementioned events and a set of random access channel (RACH) resources is assumed to be available. The set of RACH resources is defined by a single index, prach-ConfigIndex, which may take a value between 0 and 63 and identify a preamble format to be used, as well as the set of subframes in which a preamble may be sent. The set of subframes may be further restricted by a provided physical random access channel (PRACH) mask index. In some systems, including orthogonal frequency division multiple access (OFDMA) wireless communication systems, the WTRU operates in a single UL carrier. Thus, there is no ambiguity as to which UL carrier may be used.

FIG. 2 shows a communication system 200 using a single UL carrier. The WTRU 201 communicates with the network 203 using a single DL carrier 205. A PRACH configuration is broadcasted on the DL carrier 205. The WTRU sends a preamble using available PRACH resources provided by the single UL carrier 207.

The WTRU selects a RACH resource within the available set. This involves the selection of a random access preamble followed by the determination of the next subframe containing an available RACH resource. The preamble is then transmitted in the next subframe (in the case of frequency division duplex (FDD)). In the case of time division duplex (TDD), the preamble is transmitted in a randomly selected RACH resource within the next subframe or the two subsequent subframes.

If a WTRU is configured to operate with multiple UL and DL carriers in a connect mode, multiple RACH resources are available for use to initiate a random access procedure, if required. It may be beneficial to define rules under which a WTRU may determine a RACH resource to utilize and may determine which sets of RACH resources may be considered available among the configured carriers.

SUMMARY

Methods and apparatus for random access in multicarrier wireless communications are disclosed. Methods and apparatus are provided for PRACH resource signaling, PRACH resource handling, preamble and PRACH resource selection, RAR reception, preamble retransmission, and transmission and reception of subsequent messages. A method for maintaining an allowed multicarrier UL RACH configuration set by adding an UL carrier to the allowed RACH configuration set provided that a triggering event occurs and performing a RA procedure using the allowed RACH configuration set. A method for sending data in multicarrier wireless communications by determining a set of available UL carriers and selecting an UL carrier from the set of available UL carriers. A method for initial RA transmission using a multicarrier UL RACH scheme by selecting an UL carrier from a plurality of UL carriers, selecting a RA preamble group based on the selected UL carrier, and selecting a RA preamble within the selected RA preamble group. A method for transmitting a RAR using a multicarrier UL RACH scheme by determining a DL carrier for RAR transmission, computing a random access radio network temporary identifier (RA-RNTI) associated with the RAR, and transmitting the RAR including the RA-RNTI. A method for determining which DL carrier(s) the RAR should be received on by monitoring at least one PDCCH in a common search space on at least one DL carrier for a RA-RNTI that corresponds to the apparatus and receiving a RAR identified by the RA-RNTI. An apparatus configured to maintain an allowed multicarrier UL RACH configuration set by adding an UL carrier to the allowed RACH configuration set provided that a triggering event occurs and performing a RA procedure using the allowed RACH configuration set. An apparatus configured to perform multicarrier UL communications by determining a set of available UL carriers and selecting an UL carrier from the set of available UL carriers.

BRIEF DESCRIPTION OF THE DRAWINGS

A more detailed understanding may be had from the following description, given by way of example in conjunction with the accompanying drawings wherein:

FIG. 19 shows an example of a procedure for determining which DL carrier the RAR may be received on.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), or any other type of interfacing device capable of operating in a wireless environment.

Figure 1:
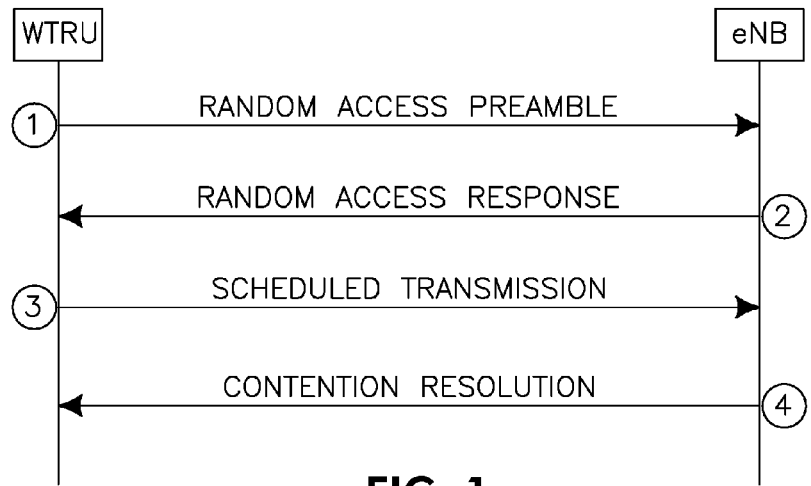
FIG. 1 shows an example of a random access procedure.
Figure 2:
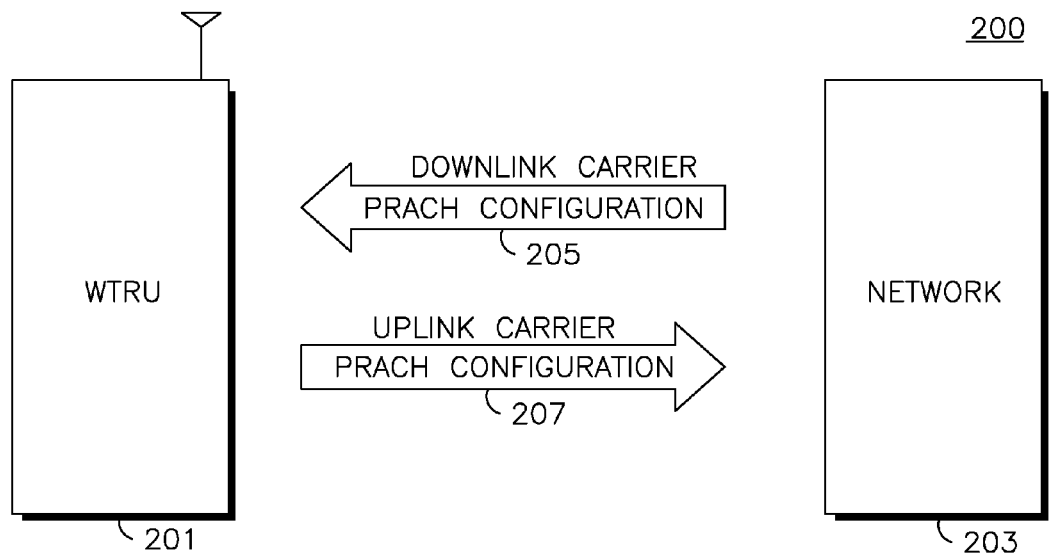
FIG. 2 is a block diagram of a single carrier communication system.
Figure 3:
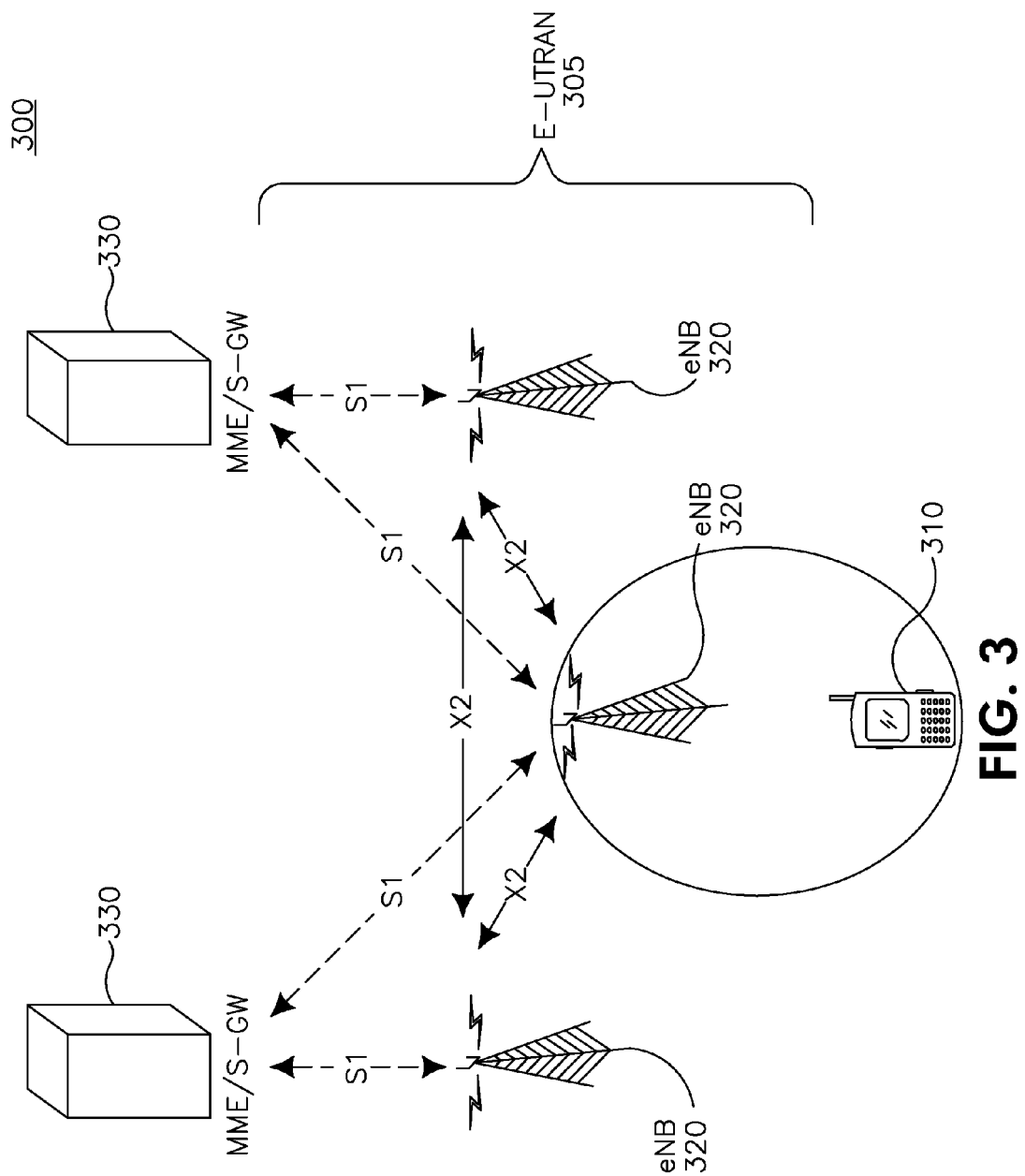
FIG. 3 shows an example LTE wireless communication system/access network.

FIG. 3 shows a wireless communication system/access network 300 that includes an Evolved-Universal Terrestrial Radio Access Network (E-UTRAN) 305, for example, 3GPP's Long Term Evolution (LTE). The E-UTRAN 305 may include several evolved Node-Bs, (eNBs) 320. The WTRU 310 may be in communication with an eNB 320. The eNBs 320 may interface with each other using an X2 interface. Each of the eNBs 320 may interface with a Mobility Management Entity (MME)/Serving GateWay (S-GW) 330 through an S1 interface. Although a single WTRU 310 and three eNBs 320 are shown in FIG. 3, it should be apparent that any combination of wireless and wired devices may be included in the wireless communication system access network 300.

Figure 4:
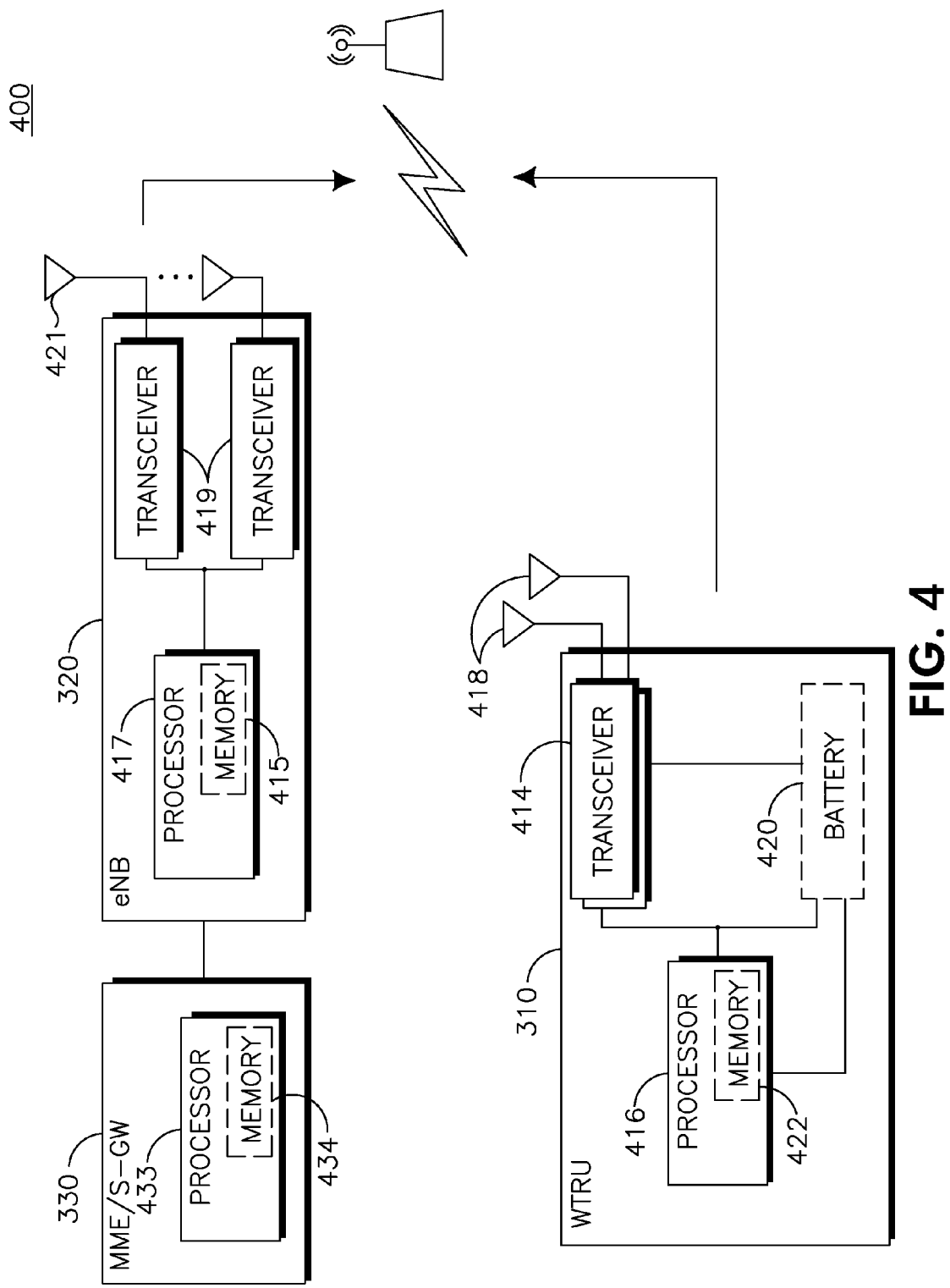
FIG. 4 is a block diagram of an example LTE wireless communications system.

FIG. 4 is an example block diagram of an LTE wireless communication system 400 including the WTRU 310, the eNB 320, and the MME/S-GW 330. As shown in FIG. 4, the WTRU 310, the eNB 320 and the MME/S-GW 330 are configured to perform random access resource selection with multiple carriers.

In addition to the components that may be found in a typical WTRU, the WTRU 310 includes a processor 416 with an optional linked memory 422, at least one transceiver 414, an optional battery 420, and at least one antenna 418. The processor 416 is configured to perform random access resource selection with multiple carriers. The at least one transceiver 414 is in communication with the processor 416 and the at least one antenna 418 to facilitate the transmission and reception of wireless communications. In case a battery 420 is used in the WTRU 310, it powers the at least one transceiver 414 and the processor 416.

In addition to the components that may be found in a typical eNB, the eNB 320 includes a processor 417 with an optional linked memory 415, transceivers 419, and antennas 421. The processor 417 is configured to perform random access resource selection with multiple carriers. The transceivers 419 are in communication with the processor 417 and antennas 421 to facilitate the transmission and reception of wireless communications. The eNB 320 is connected to the Mobility Management Entity/Serving GateWay (MME/S-GW) 330 which includes a processor 433 with an optional linked memory 434.

In some wireless communications systems configured to perform uplink multiple-input multiple-output (MIMO) communications, such as, for example, a system based on LTE Release 10 (R10) (also referred to as "LTE-Advanced" or "LTE-A"), a WTRU may be configured to use random access resources on multiple configured UL carriers, that is, resources from more than one UL carrier. Additionally, a dedicated preamble may be associated with a specific carrier. RACH resources may be selected randomly or in sequence where the RA procedure is initiated by the medium access control (MAC) layer. When random access resources are initiated based on a PDCCH order, the PDCCH order and Random Access Response (RAR) may be transmitted on the DL carrier. The DL carrier may be associated, for example, by the UL/DL pairing, or based on configuration of the uplink carrier supporting the RACH. The WTRU may determine that the UL communications have completely failed if the RA procedure was initiated by MAC and the RA procedure was unsuccessful for each of the RACH resources available to the WTRU in succession.

Some wireless communication systems, such as those based on LTE-A, may include the use of bandwidth extensions such as carrier aggregation (CA). With CA, a WTRU may transmit and receive simultaneously over multiple component carriers (CCs). Up to five CCs in the UL direction and in the DL direction may be available, thereby supporting flexible bandwidth assignments up to 100 MHz. The WTRU may operate with multiple UL and DL carriers in the connected mode.

When referred to hereafter, the term "primary component carrier (PCC)", or anchor carrier, may include a carrier of a WTRU configured to operate with multiple component carriers for which some functionality (for example, derivation of security parameters and non-access stratum (NAS) information) may be applicable to that particular CC. The WTRU may be configured with at least one PCC for the DL direction (DL PCC). Consequently, a carrier that is not a PCC of the WTRU may hereafter be referred to as a "secondary component carrier" (SCC).

The DL PCC may, for example, correspond to the CC used by the WTRU to derive initial security parameters when initially accessing the system. The definition of the DL PCC may not be limited to this definition and may be considered the CC that contains important parameters or information for system operation. A primary cell (PCell) may be the cell corresponding to the combination of one DL PCC and one UL PCC. The PCell may correspond to the DL CC used as anchor for NAS mobility and for derivation of security parameters (for example, during initial access).

PDCCH monitoring may be performed when a WTRU has an established connection to the network. This PDDCH monitoring may occur when the WTRU is in RRC_CONNECTED state. A WTRU may perform PDCCH monitoring to get access to physical radio resources for DL assignment or UL grant transmissions.

A WTRU configured with multiple CCs may have to receive control signaling for scheduling of all CCs either on a single PDCCH (for example, in the PCC) or on multiple PDCCHs, each on a different CC. This may result in an increase in the reception and processing of PDCCH signaling. Decoding of the PDCCH channel may require the WTRU to perform a number of blind decoding attempts, each validated by a cyclic redundancy check (CRC), to determine whether signaling may be intended for a specific WTRU. In addition, the network may use cross-carrier scheduling, where grants and/or assignments signaled on the PDCCH of one CC may indicate transmissions on the physical uplink shared channel (PUSCH) or physical downlink shared channel (PDSCH) corresponding to a different CC. Blind decoding complexity may be reduced by requiring a WTRU to monitor control signaling only on a subset of the configured CCs. A specified PDCCH monitoring set may represent a set of CCs on which the WTRU may be required to monitor, the size of which may be less than or equal to the size of the UL/DL CC set and may comprise only CCs that are in the WTRU DL CC set.

As used herein, the terms "PRACH configuration" and "RACH configuration" refer to a set of parameters corresponding to the information elements (IEs). Examples of PRACH/RACH configuration parameters include the IEs' PRACH-Config and RACH-ConfigCommon as used in, for example, Release 8 of LTE. A PRACH/RACH configuration may apply to a specific pair of DL and UL carriers. The DL carrier of a PRACH or a RACH configuration is a carrier on which these configurations may be broadcasted. The UL carrier of a PRACH or a RACH configuration is the carrier on which the preamble may be transmitted. The UL carrier may be obtained from the default duplex distance or may be signaled explicitly from the DL carrier, for example, in system information block 2 (SIB2).

The number of aggregated carriers in the UL and DL directions may be designated, respectively, by $N_{UL}$ and $N_{DL}$. In asymmetric carrier aggregation, $N_{UL}$ may not equal $N_{DL}$. The RACH period of each UL CC may be denoted as $T_{RACH}$.

The RACH period may be reduced from a WTRU's perspective via staggering. For example, the RACH period of each UL CC may remain at 10 ms while the random access opportunity timing may be staggered across aggregated UL CCs. For example, one UL CC may have no timing offset while another UL CC may have a timing offset of 5 ms. From the WTRU's perspective, the RACH period may appear to be 5 ms, resulting in a 5 ms "effective RACH period." Thus, different UL CCs may have a different RACH timing offset (subframe) within the same RACH period. An effective RACH period of less than 10 ms (the LTE RACH period) may be achieved.

Figure 5:
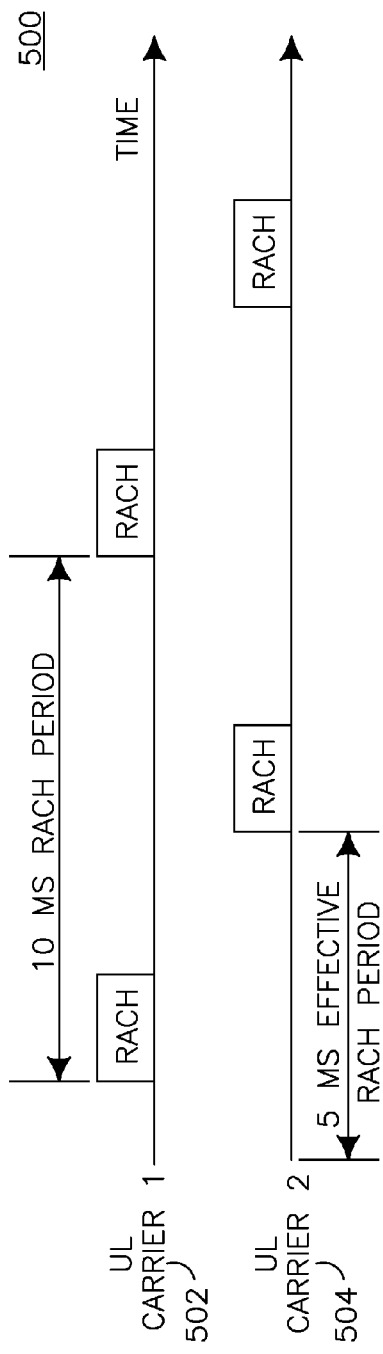
FIG. 5 shows an example of RACH period reduction via staggering.

FIG. 5 shows an example of RACH period reduction via staggering 500, including a first UL carrier (UL carrier 1) 502 and a second UL carrier (UL carrier 2) 504. UL carrier 1 502 has a 10 ms RACH period. UL carrier 2 504 has a 10 ms RACH period with a timing offset of 5 ms from UL carrier 1 502. Thus, FIG. 5 demonstrates a 5 ms effective RACH period. Generally, an effective RACH period of $T_{RACH}/N_{UL}$ may be achieved.

Figure 6:
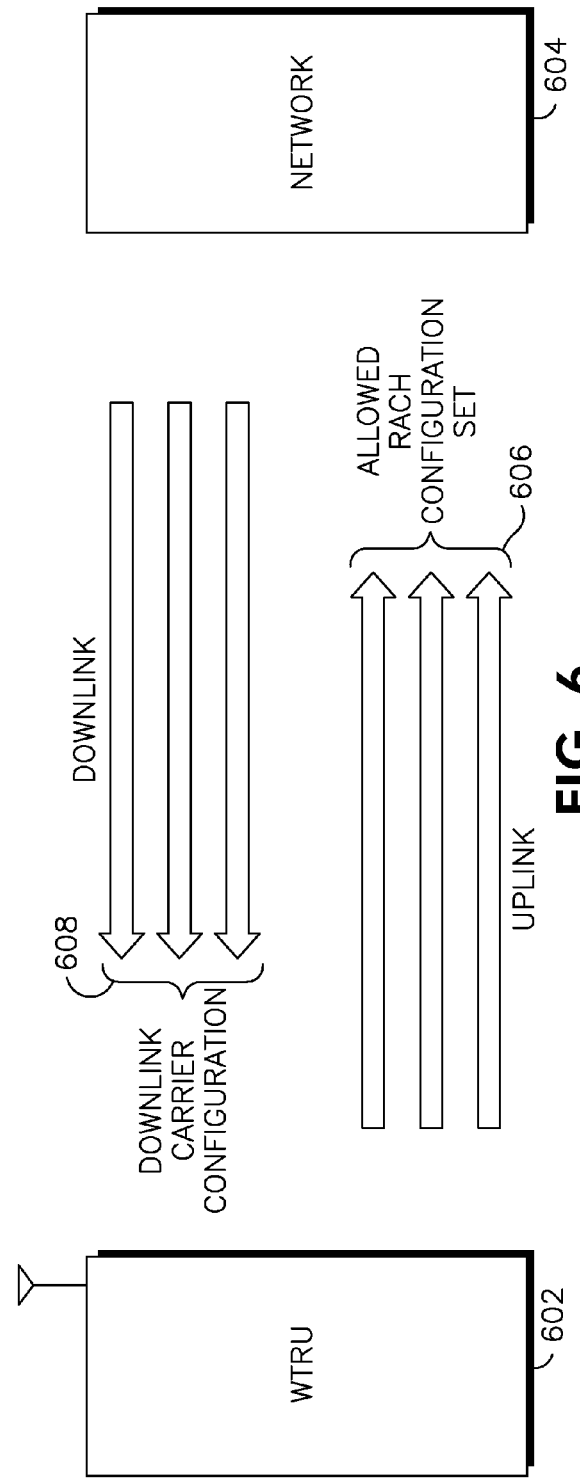
FIG. 6 shows a WTRU and network configured for use with multiple UL carriers and DL carriers that may maintain an allowed RACH configuration set.

FIG. 6 shows a WTRU 602 and network 604 configured for use with multiple UL carriers 606 and DL carriers 608 that may maintain a set of RACH configurations that may potentially be used by the WTRU 602 for random access. This set may be referred to as the "allowed RACH configuration set." An element of the allowed RACH configuration set may include a PRACH configuration or may include a PRACH configuration and a RACH configuration. A WTRU configured for UL MIMO may require the following information in order to perform a RA procedure: RACH parameters for each UL carrier on which the WTRU may transmit RACH messages (for example, as carried in SIB2 in LTE); RACH start timing offset of each UL carrier on which the WTRU may transmit RACH messages; and location (for example, center frequency) and the bandwidth of each UL carrier on which the WTRU may transmit RACH messages. A WTRU may only need to acquire this information when the WTRU transitions from idle to connected state. A WTRU transitioning from dormant to active sub-state may already know such information.

In one embodiment, a WTRU may determine the allowed RACH configuration set via information received on a DL PCC using one or a combination of fields. The fields may include: the spare (or reserved) bit in P-BCH; the nonCriticalExtension field of SIB1; or a new SIB type that may complement SIB2. This embodiment may also include transmitting SIB2 for each DL carrier that is mapped to or paired with each UL carrier on which the WTRU may perform a RA procedure. Optionally, the common information between different SIBs may be transmitted or signaled once.

In another embodiment, a WTRU may determine the allowed RACH configuration set via SIB2, which may be transmitted on each DL PCC. SIB2 may contain RACH configuration parameters and an UL carrier's location and bandwidth. Each DL carrier may use a predetermined number of bits to signal a RACH start timing offset of the UL CC that the DL carrier is mapped to or paired with. One or a combination of several fields may be used to accomplish this, including the spare (or reserved) bit in the physical broadcast channel (PBCH); the nonCriticalExtension field of SIB1; or a new SIB type. This embodiment may be applied to a scenario in which a WTRU transitions from dormant to active sub-state. Optionally, the RACH start timing offset is transmitted on the DL PCC.

In another embodiment, a WTRU may determine the allowed RACH configuration set implicitly through the WTRU carrier configuration provided, for example, by RRC messaging or signaling. The allowed RACH configuration set may be chosen as one or a plurality of the following sets. One possible set may include all PRACH/RACH configurations broadcasted by the DL carriers that the WTRU is configured to use. Another possible set may include one PRACH/RACH configuration per UL carrier that the WTRU is configured to use. The PRACH/RACH configuration for each UL carrier may be provided by its corresponding DL carrier or may be provided by dedicated signaling. Another possible set may include at most one PRACH/RACH configuration per UL carrier that the WTRU is configured to use, provided that a single PRACH/RACH configuration exists for each set of UL carriers sharing a particular timing alignment (TA). Timing alignment may also include "timing advance," which may be a value that represents how early a WTRU may start its transmission in a given subframe as compared to its DL reception. Timing advance may be a function of the WTRU's distance to the eNB or may be a function of the frequency band. Another possible set may include one or more PRACH/RACH configurations per UL carrier associated with one or more DL carriers included in the PDCCH monitoring set.

Each of the $N_{DL}$ DL carriers may be used by distinct cells broadcasting their own cell identities. The WTRU may acquire system information pertaining to one or a plurality of DL carriers. The system information may be transmitted on a carrier (for example, a DL PCC), on a subset of specific carriers, or on all DL carriers.

A WTRU may modify the allowed RACH configuration set according to events or upon receiving explicit signaling indicating that the allowed RACH configuration set should be modified. A WTRU may add a new PRACH/RACH configuration set to the allowed RACH configuration.

Figure 7:
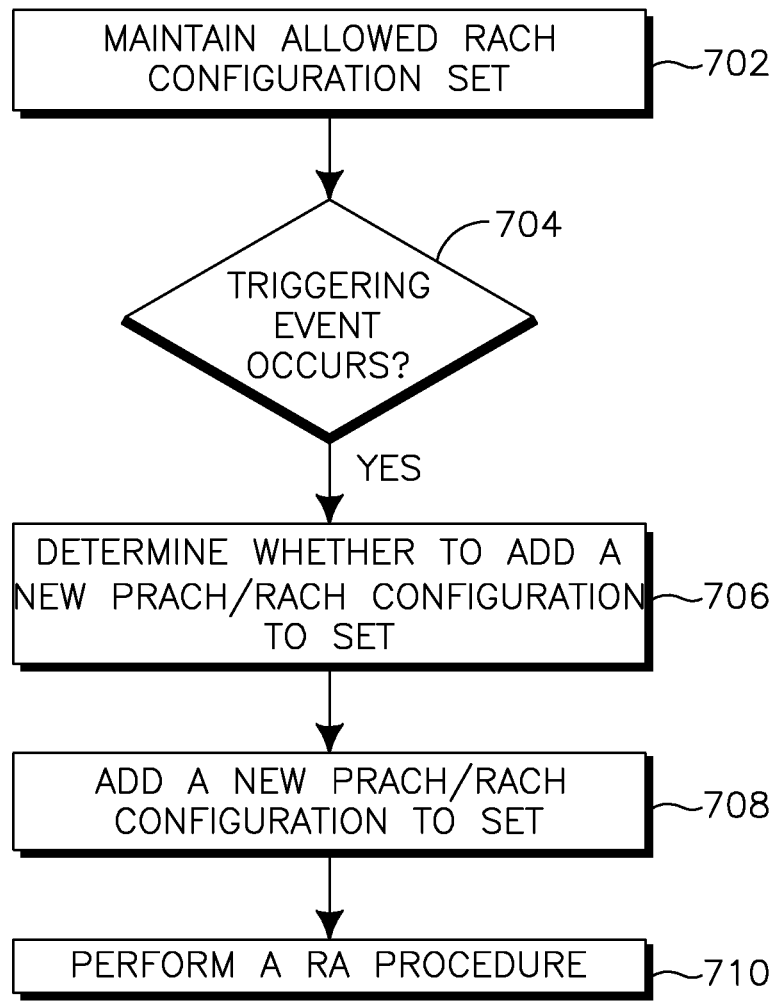
FIG. 7 is a flowchart of a procedure for adding a new PRACH/RACH configuration to the allowed RACH configuration set.

FIG. 7 is a flowchart of a procedure 700 for adding a new PRACH/RACH configuration to the allowed RACH configuration set. A WTRU may add a new PRACH/RACH configuration to the allowed RACH configuration set provided that at least one of a plurality of addition triggering events occurs. For example, a WTRU may maintain an allowed RACH configuration set 702. If an addition triggering event occurs 704, the WTRU may determine whether to add a new PRACH/RACH configuration to the allowed RACH configuration set 706. The WTRU then adds a PRACH/RACH configuration to the allowed RACH configuration set 708. The WTRU may perform a RA procedure 710. An addition triggering event may also be used as any type of triggering event, such as a removal or invalidation triggering event.

An addition triggering event may include receiving explicit signaling from the network. The explicit signaling may include an indicator sent along with the carrier configuration via RRC signaling. The RRC signaling may indicate that the PRACH/RACH configuration broadcasted on the DL carrier being added to the configuration should be added to the allowed RACH configuration set.

Alternatively or additionally, an addition triggering event may include receiving a PDCCH order on the DL carrier broadcasting the PRACH/RACH configuration. Alternatively or additionally, an addition triggering event may include receiving a PDCCH order with a carrier indication field (CIF) indicating the DL carrier broadcasting the PRACH/RACH configuration. Alternatively or additionally, an addition triggering event may include receiving a PDCCH order with a CIF indicating the DL carrier that is broadcasting the PRACH/RACH configuration. A PDCCH order may be control signaling received from the network instructing the WTRU to initiate a RA procedure using the RACH parameters provided in the control signaling, assuming they are present. The PDCCH order may indicate the CC for which the control signaling is applicable or the identity of the DL CC on which the WTRU may read the broadcasted configuration.

Figure 8:
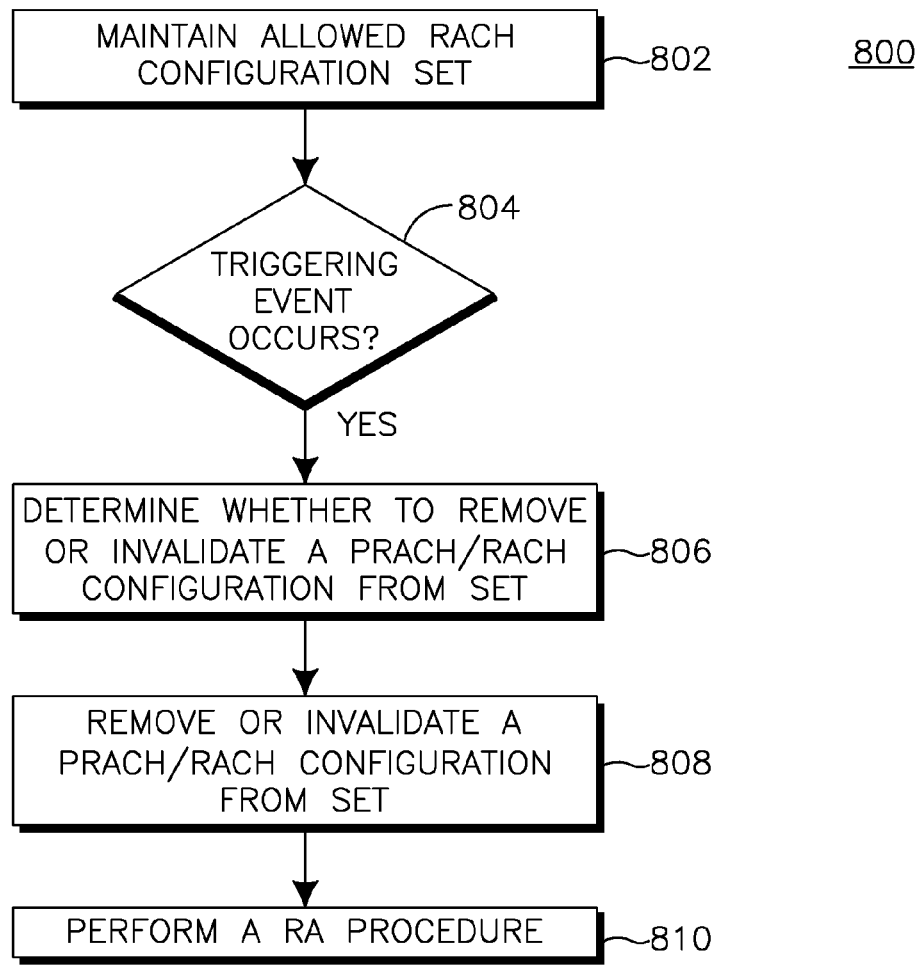
FIG. 8 is a flowchart of a procedure for removing or invalidating for a period of time a PRACH/RACH configuration from the allowed RACH configuration set.

FIG. 8 is a flowchart of a procedure 800 for removing or invalidating for a period of time a PRACH/RACH configuration from the allowed RACH configuration set. A WTRU may remove or invalidate a PRACH/RACH configuration from the allowed RACH configuration set on a condition that at least one of a plurality of removal/invalidation triggering events occurs. In the procedure 800 of FIG. 8, a WTRU may maintain an allowed RACH configuration set 802. If a removal/invalidation triggering event occurs 804, the WTRU may determine whether to remove or invalidate a PRACH/RACH configuration from the allowed RACH configuration set 806. The WTRU may remove or invalidate a PRACH/RACH configuration from the allowed RACH configuration set 808. The WTRU may perform a RA procedure 810. A removal/invalidation triggering event may also be used as any type of triggering event, such as an addition or invalidation triggering event.

A removal/invalidation triggering event may include receiving explicit signaling from the network. Examples of explicit signals include RRC, MAC, or PDCCH signals that may be similar to a backoff indicator. A backoff indicator may be an indication that the WTRU may refrain from performing a given procedure, at least for a certain period of time. Alternatively or additionally, a removal/invalidation triggering event may include determining that the DL carrier broadcasting the PRACH/RACH configuration has been removed from the carrier configuration. An example may be receiving a RRC reconfiguration message. Alternatively or additionally, a removal/invalidation triggering event may include determining that the UL carrier corresponding to the PRACH/RACH configuration has been removed from the carrier configuration. An example may be receiving a RRC reconfiguration message. Alternatively or additionally, a removal/invalidation triggering event may include reaching the maximum number of preamble transmissions (for example, preambleTransMAX) after transmitting a preamble for a PRACH/RACH configuration. Another example may include an unsuccessful RAR reception, where preambleTransMAX is equal to the maximum value. For example, upon reaching the maximum value, the WTRU may remove or invalidate the corresponding configuration, in addition to other responses the WTRU may already perform upon reaching the maximum value.

Figure 9:
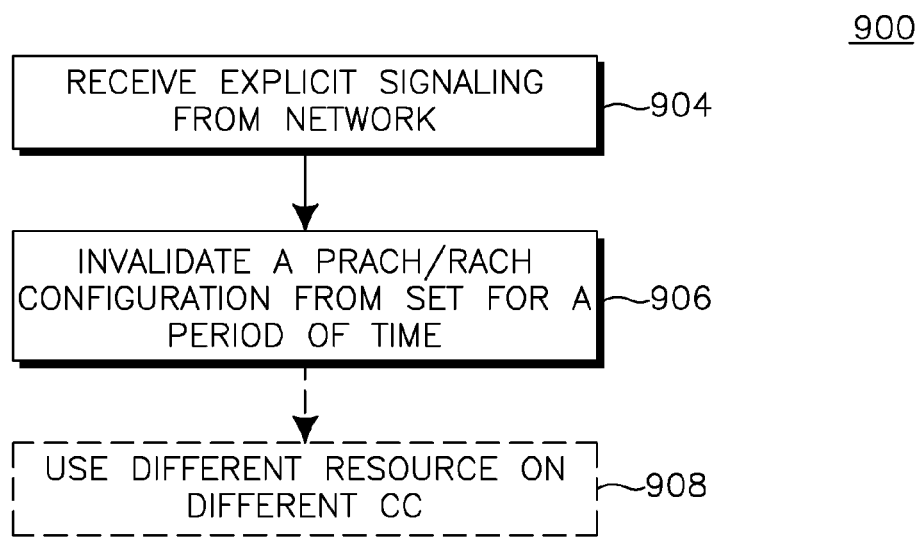
FIG. 9 is a flowchart of an example procedure for invalidating a PRACH/RACH configuration from the allowed RACH configuration set for a certain period of time.

FIG. 9 is a flowchart of an example procedure 900 for invalidating a PRACH/RACH configuration from the allowed RACH configuration set for a certain period of time. A WTRU that receives explicit signaling from the network 904 may invalidate a PRACH/RACH configuration from the set for a period of time 906. For example, the signaling may be similar to a backoff indicator or may be a backoff or prohibit time during which the WTRU may not use a specific PRACH/RACH configuration. Optionally, the WTRU may use a different resource on a different CC 908. An invalidation triggering event may also be used as any type of triggering event, such as an addition or removal/invalidation triggering event.

The criterion for indicating a "random access problem" may be modified based on the allowed RACH configuration set so that a WTRU may attempt random access on multiple UL carriers.

Figure 10:
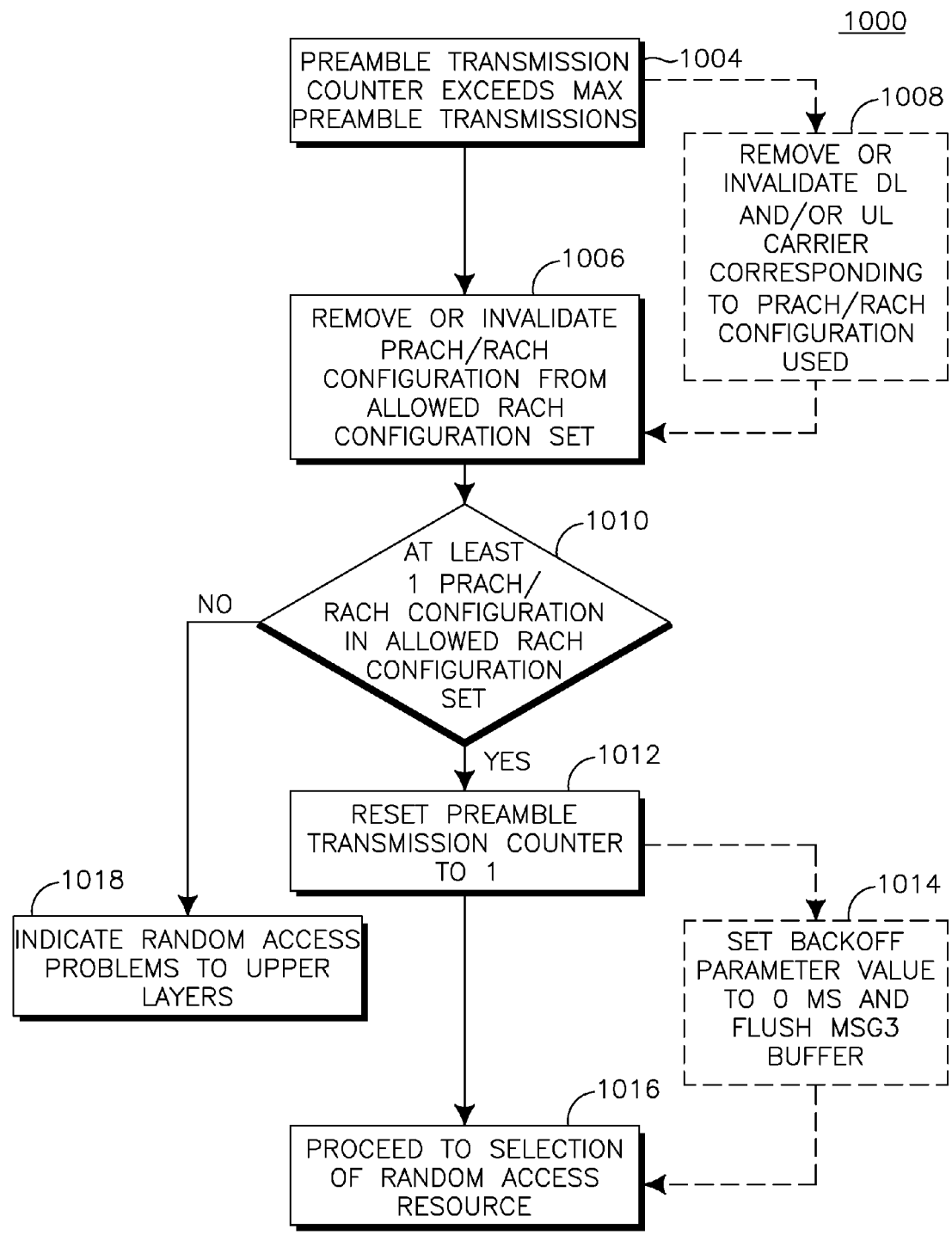
FIG. 10 is a flowchart of a procedure for determining that a predetermined maximum number of preamble transmissions have occurred and selecting a new random access resource or reporting a random access problem.

FIG. 10 is a flowchart of a procedure 1000 for determining that a predetermined maximum number of preamble transmissions have occurred and for selecting a new random access resource or for reporting a random access problem. If the preamble transmission counter exceeds the maximum number of preamble transmissions 1004 (for example, PREAMABLE_TRANSMISSION_COUNTER=preambleTransMax+1), a WTRU may remove or invalidate the PRACH/RACH configuration from the allowed RACH configuration set 1006. Optionally, the WTRU may remove or invalidate PRACH/RACH configurations in the following cases: (1) the configuration was provided by dedicated signaling, for example, via RRC configuration; (2) the configuration was provided for a SCC of the WTRU's configuration or for all SCCs of the same frequency band; or (3) the configuration was configured such that, upon failure of the RA procedure on the corresponding resource, the WTRU does not trigger radio link failure (RLF).

Alternatively or additionally, the WTRU may remove or invalidate the DL and/or UL carrier corresponding to the PRACH/RACH configuration used for transmission of the preamble from the carrier configuration 1008. This may also result in the WTRU removing the PRACH/RACH configuration from the allowed RACH configuration set 1006. The WTRU may then determine whether there is at least one PRACH/RACH configuration in the allowed RACH configuration set 1010.

If the WTRU determines that there is at least one valid PRACH/RACH configuration in the allowed RACH configuration set, the WTRU may reset the preamble transmission counter to 1 (for example PREAMABLE_TRANSMISSION_COUNTER=1) 1012. The WTRU may then proceed to selection of a random access resource within the allowed RACH configuration set 1016 and may optionally set the backoff parameter value to 0 ms and flush the msg3 buffer 1014.

If the WTRU determines that there is not at least one PRACH/RACH configuration in the allowed RACH configuration set (meaning the allowed RACH configuration set is empty or there is no valid item in the set), the WTRU may indicate a random access problem to upper layers 1018. Examples of the indication in element 1018 may include "RA problems" or "UL RLF." Optionally, this may be time-limited. For example, given that the indication pertains to the management of the resources available to the WTRU, the indication may be provided or may be valid only for a certain amount of time. The amount of time may be based on a timer or may be based on the subsequent addition of an item to the allowed RACH configuration set. The maximum number of preamble retransmissions for a given PRACH resource, whether dedicated or not, may or may not be the same for all resources of the WTRU's allowed RACH configuration set. For example, the parameter corresponding to the maximum number of preamble retransmissions may be common to all items in the allowed RACH configuration set or may be specified for each item or for particular groups in the allowed RACH configuration set.

As an example, in one possible embodiment, a WTRU may attempt a RA procedure using a first PRACH/RACH configuration for which a failure of the RA attempt does not trigger a RLF (for example, a RA attempt in a SCC for gaining TA and/or a RA attempt triggered by a PDCCH order received from the network). Additionally, the WTRU may determine that a RLF may not be triggered by a failure based on at least one of the following: (1) the PRACH/RACH configuration was received via dedicated signaling; (2) the PRACH/RACH configuration corresponds to a SCC of the WTRU's configuration; or (3) the PRACH/RACH configuration indicates that RA failure does not trigger a RLF.

If a failure of the RA procedure is detected for the first PRACH/RACH configuration, the WTRU may perform a RA procedure using a second PRACH/RACH configuration for which a failure of the RA attempt does trigger a RLF and for which the WTRU determines that a RLF shall not be triggered upon failure based on at least one of the following: (1) the PRACH/RACH configuration was received by signaling from the broadcasted system information; (2) the PRACH/RACH configuration corresponds to a PCC of the WTRU's configuration; or (3) the PRACH/RACH configuration indicates that RA failure triggers a RLF. If the failure of the RA procedure is detected for the second PRACH/RACH configuration, the WTRU may indicate a "random access problem" to upper layers via, for example, RRC messaging.

The WTRU may receive a network request to perform a random access procedure. This request may be signaled on the PDDCH (hereinafter "PDCCH RA order"), for example, using downlink control information (DCI) format 1a. For a WTRU configured to operate with multiple CCs and possibly also with cross-carrier scheduling (for example, where the PDCCH in one carrier may be used to schedule assignments on the PDSCH or grant resources on the PUSCH of a different carrier), it may be necessary to determine which RACH resource the WTRU may use upon reception of a PDCCH RA order.

RACH resource selection may include selection of a PRACH among a set of available PRACHs and selection of a preamble. The selection of a PRACH may include choosing PRACHs that may be on different UL carriers. The selection of a preamble may include choosing a preamble from a preamble group on a condition that more than one preamble group exists.

To determine which resource the WTRU may select for the RA procedure, the WTRU may make a selection at least in part as a function of the CC for which the received control information is applicable, on a condition that the WTRU receives a request from the network to perform random access. For example, the selected resource may correspond to a PCC or a SCC of the WTRU's allowed RACH configuration set.

A WTRU may detect control information on the PDCCH. For example, the WTRU may receive a DCI format scrambled with a radio network temporary identifier (RNTI) applicable to the WTRU (WTRU's Cell-RNTI (C-RNTI)). Upon successful detection of control information on the PDCCH indicating that the WTRU may perform the random access procedure, a WTRU may detect whether the DCI format is applicable to a SCC of the WTRU's configuration or to a PCC of the WTRU's configuration. A DCI format may be considered to be applicable to a CC provided that: (1) it is received on the PDCCH of the DL CC corresponding to the CC; or (2) the CIF indicates the CC or corresponds to the CC. If the DCI format is applicable to a SCC, the WTRU may perform at least one or a combination of the following: (1) The WTRU may refrain from performing a random access attempt. For example, the WTRU may ignore the received PDCCH RA order. This may be on a condition that a WTRU only considers a PDCCH order received in a PCC as valid; otherwise, it may be a false detection or a network error. For example, a false detection may be that a WTRU successfully decodes a DCI message scrambled on the PDCCH using one of the WTRU's RNTI, but the message was not intended for that particular WTRU. Decoding may use some form of checksum verification using a 16-bit RNTI, so false detection may occur. (2) The WTRU may perform a RA procedure in a PCC of its configuration, which may be the case if a WTRU may only perform RA in a PCC (for example, where there is DL data arrival for an unsynchronized WTRU). (3) The WTRU may perform a RA procedure using a RACH resource of the applicable SCC, which may be the case if a WTRU performs RA in a SCC (for example, for gaining TA for the CC or a group of CCs with the same TA requirement and/or in the case of downlink data arrival for an unsynchronized WTRU). (4) The WTRU may perform a RA procedure using a RACH resource of any CC which may be part of a group for which the corresponding UL CC has the same TA requirement, which may be the case if different UL CCs may have different TA requirements. (5) The WTRU may perform a RA procedure using a resource indicated in the DCI message, for example, using an index to a resource which is part of the WTRU configuration. This may be useful for load balancing in the case of downlink data arrival for an unsynchronized WTRU.

If the DCI format is applicable to a PCC, the WTRU may perform a RA procedure on a resource of the PCC. A DCI format may be considered to be applicable to a CC on a condition that (1) it is received on the PDCCH of the DL CC corresponding to the CC; or (2) the CIF indicates the CC or corresponds to the CC.

A WTRU may determine which set or sets of PRACH configurations within the allowed RACH configuration set are available for selection of a PRACH resource. The selection of the PRACH resource may optionally also be considered to be at least partly a function of the reason and/or cause for which the WTRU performs a random access procedure. For example, the reason or cause may be a PDCCH RA order (with or without CIF), RA-SR, or RA for a connection re-establishment. The set of PRACH resources that the WTRU may consider as available may depend on what triggered the random access procedure and how the random access procedure was triggered. The following embodiments are examples of ways in which a WTRU may select a PRACH resource from a set of available PRACHs.

In one embodiment, a CIF may be used in a PDCCH containing a PDCCH order for a RA procedure. The CIF may indicate at least one DL CC and/or at least one UL CC. The WTRU may receive a PDCCH order along with a CIF and select a PRACH from a set of available PRACH resources given by the PRACH configuration (for example, prach-ConfigIndex) broadcasted on the DL carrier indicated by the CIF. This indication may be an explicit indication of the PRACH configuration or may be implicit, for example, based on association with a paired UL carrier.

Alternatively or additionally, the WTRU may select a PRACH resource from a set of PRACHs available on the UL carrier indicated by the CIF. This indication may be an explicit indication of the PRACH configuration or may be implicit, for example, based on association with a paired DL carrier. The set of PRACHs may include the union of multiple sets of PRACHs, with the sets provided via the broadcasts of PRACH configurations on multiple DL carriers, on a condition that more than one DL carrier broadcasts PRACH configurations for the same UL carrier.

Alternatively or additionally, the WTRU may select a PRACH resource from a set of available PRACH resources represented as an indexed set and using the CIF as an index. The CIF may be interpreted as an index to an ordered sequence of a set of PRACH resources. The order of the set of PRACH resources in the index may be the order in the WTRU's configuration of the DL carriers on which the set of PRACH resources was broadcasted.

In another embodiment, the WTRU may receive a PDCCH order, with or without a CIF, or may initiate a RA procedure due to a SR being triggered without a valid PUCCH resource. A SR may be triggered if a WTRU needs to send a Buffer Status Report (BSR). A BSR may be triggered periodically, if configured, or if the WTRU has new data available for UL transmission with a higher priority than any existing data. The WTRU may select a PRACH resource from a set of available PRACH resources provided by the PRACH configuration broadcasted by the DL carrier corresponding to the PCell, on a condition that the PRACH configuration is present in the allowed RACH configuration set. Otherwise, the WTRU may determine that the set of available PRACH resources is provided by the union of all sets of PRACH resources provided by all PRACH configurations in the allowed RACH configuration set.

Alternatively or additionally, the WTRU may select a PRACH resource from a set of available PRACH resources provided by the sets of PRACHs available on the UL carriers for which the applicable TA timer last expired or for which the last TA command was received.

Alternatively or additionally, the WTRU may use an identity of the WTRU in the selection of the PRACH resource from the set of available PRACH resources. For example, this may include using a hashing function or using the identity as an index to a list, for example, to distribute the load across available resources. PRACH resources may be available to multiple WTRUs and access to the PRACH resources may be contention-based. Thus, it may be useful to distribute the load as the number of WTRUs in a cell increases. A hash function may randomize the selection of one resource from a set of resources, which may allow each resource an equal chance of being selected. This may help distribute the load across available resources.

Alternatively or additionally, the WTRU may consider the set of available resources as a priority list. For example, a resource may have a higher priority based on at least one of: (1) a configuration of the network; (2) the DL path loss, based on measurements for a DL CC used for the path loss determination for the UL CC corresponding to the resource; (3) a ranking of the resource based on some criteria, for example, the maximum number of attempts before the WTRU may declare RA failure; (4) round-robin attempts; (5) previous outcome of a RACH procedure on the resource; (6) whether the CC is a PCC or a SCC of the WTRU's configuration; (7) whether or not the resource was provided to the WTRU in a dedicated manner (for example, by dedicated RRC signaling that configured the WTRU for multicarrier operation), possibly having a specific number of preamble transmissions for the resource that differs from that of the maximum number of preamble transmissions broadcasted on the DL CC corresponding to that resource; or (8) whether or not the resource was provided to the WTRU via broadcasted system information (for example, by RRC signaling received by the WTRU on the BCCH, which may include the maximum number of preamble transmissions).

As an example, the WTRU may give a higher priority to a resource provided in a dedicated manner (such as, a resource corresponding to a SCC of the WTRU's configuration). If the random access procedure fails on such a resource (meaning that the procedure is not successful after reaching the maximum number of preamble transmissions), the WTRU may select a resource provided by system information (for example, a resource corresponding to a PCC of the WTRU's configuration). The WTRU may then attempt a random access using this resource (for example, if the WTRU does not declare UL RLF due to a RACH failure using the dedicated resource). On a condition that the random access attempt fails for the resource provided by system information, the WTRU may declare UL RLF and may perform recovery actions accordingly.

In another embodiment, the WTRU may receive a PDCCH order, with or without a CIF. The WTRU may select a PRACH resource from a set of available PRACHs determined as the union of the sets of PRACHs provided by all PRACH configurations in the allowed RACH configuration set, on a condition that the PDCCH order indicates that the preamble may be chosen randomly (for example, preamble index="000000"). Otherwise, the set of available PRACHs may be selected according to any of the other embodiments described herein.

Alternatively or additionally, the WTRU may select a PRACH resource from a set of available PRACHs determined as the union of the sets of PRACHs provided by PRACH configurations in the allowed RACH configuration set for which the corresponding UL carrier is not synchronized (or not time-aligned).

In another embodiment, the WTRU may initiate a random access procedure upon receiving an UL grant for a PUSCH on an UL carrier for which the applicable TA timer has expired. The WTRU may select a PRACH resource from the set of available PRACHs provided by the sets of PRACHs available on the UL carrier for which the applicable TA timer has expired. Alternatively or additionally, the WTRU may select a PRACH resource from the set of available PRACHs provided by the sets of PRACHs available on the UL carrier for which the applicable TA timer has expired as well as any UL carrier sharing the same TA (for example, in the same TA subgroup).

Figure 11:
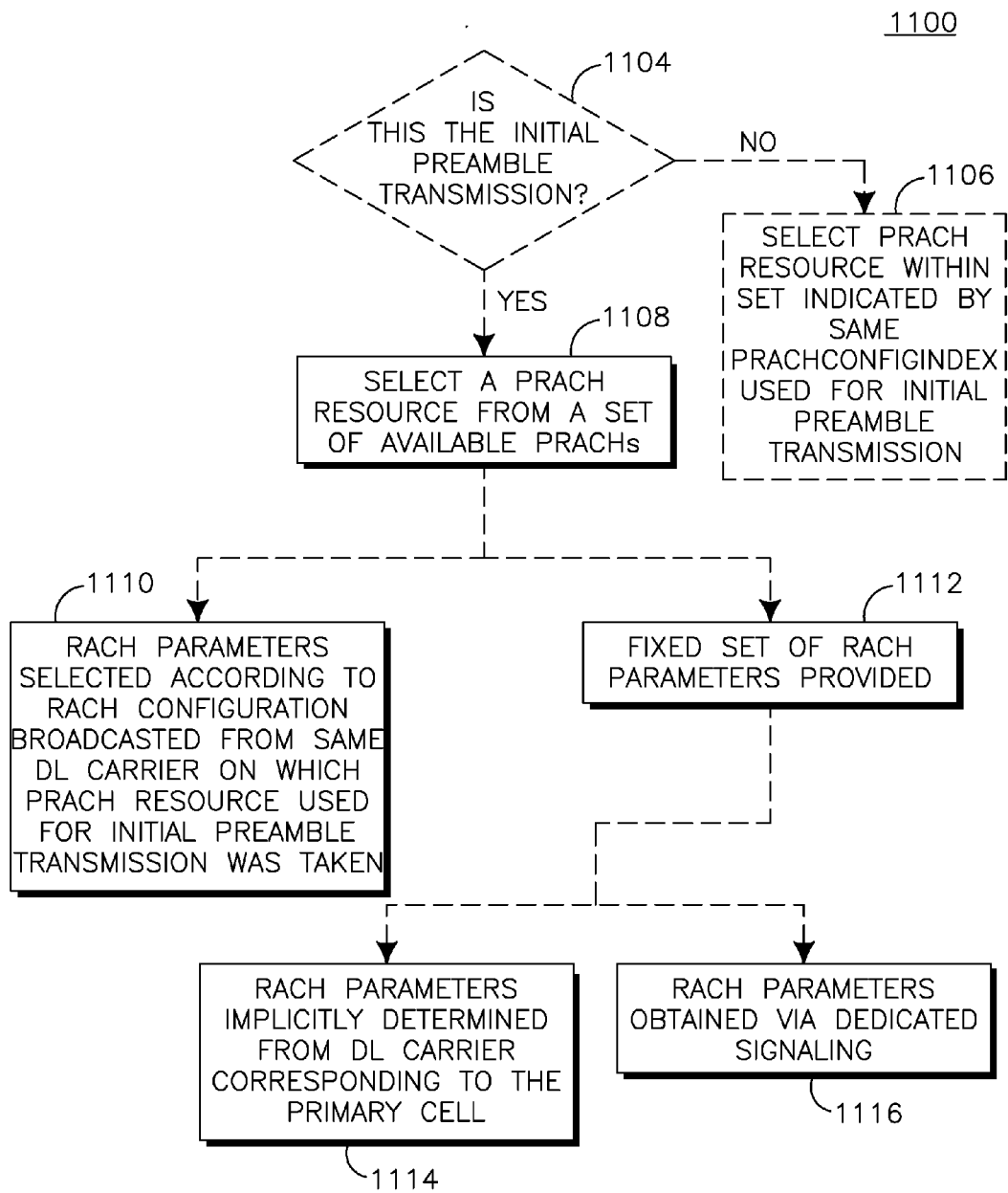
FIG. 11 is a flowchart of a procedure for selecting PRACH resources from a set of available PRACH resources.

FIG. 11 is a flowchart of a procedure 1100 for selecting PRACH resources from a set of available PRACH resources defined by multiple prach-ConfigIndex messages. Optionally, a WTRU may determine whether the transmission is the initial preamble transmission 1104, for example, if the parameter PREAMBLE_TRANSMISSION_COUNTER is equal to 1 and/or if the msg3 buffer is empty. If the transmission is not the initial preamble transmission (for example, PREAMBLE_TRANSMISSION_COUNTER is greater than 1), the WTRU may optionally be constrained to select a PRACH resource within the set indicated by the same prach-ConfigIndex utilized for the initial preamble transmission 1106.

The WTRU may select a PRACH resource from a set of available PRACH resources 1108. Optionally, the WTRU may select a PRACH resource on a condition that the transmission is the initial preamble transmission 1104. One or a combination of the following four embodiments may be used to select a PRACH resource from a set of available PRACH resources.

In one embodiment, a WTRU may select resources corresponding to a specific prach-ConfigIndex within the available set. Optionally, this selection may be determined randomly. The WTRU may then determine the next available subframe containing a PRACH resource for this specific prach-ConfigIndex. Optionally, other restrictions may be applied. For example, using TDD mode in LTE, the WTRU may randomly select one occasion within three consecutive occasions. The occasions may start from the first available occasion or may start no earlier than at n+6 subframes provided that a PDCCH order is received at subframe n.

In another embodiment, a WTRU may determine the next available subframe containing an available PRACH resource within the set of all available PRACH resources given by the set of prach-ConfigIndex parameters that may indicate resources on more than one UL frequency. The WTRU may then select one available PRACH resource within the subframe (or within the next n subframes), on a condition that there is more than one PRACH resource available. The selection may be random. Another way to describe this embodiment is that a WTRU may select the PRACH configuration(s) or prach-ConfigIndex for which it can utilize a PRACH resource the earliest among the available PRACH resources.

In another embodiment, the WTRU may select a resource from a set of available PRACH resources with a further restriction that the selected PRACH resource corresponds to a UL CC for which the associated DL CC is configured and activated. For example, the WTRU may receive a PDSCH transmission and may also monitor the PDCCH. This may also correspond only to a DL CC that has been explicitly activated by signaling received from the network. This may be useful to determine the initial transmit power of the preamble, which may be a function of the path loss measured from a DL CC used for the path loss determination for the UL CC.

In another embodiment, the WTRU may select a resource from a set of available PRACH resources with a further restriction that the selected resource corresponds to a UL CC that is configured, for example, meaning that the UL CC is available to the WTRU for UL transmissions. Optionally, the UL CC may also need to be activated, assuming that an activated/deactivated state is applicable to UL CCs. This may only correspond to an UL CC that has been explicitly activated by signaling received from the network.

Alternatively or additionally, for any of the above-described embodiments, the WTRU may select any PRACH resource within multiple prach-ConfigIndex messages if the PRACH resources are on the same UL carrier as the UL carrier used for the initial preamble transmission.

Referring again to FIG. 11, upon selecting a PRACH resource 1108, the WTRU may select RACH parameters (for example, preambleInfo, powerRampingparameters and ra-SupervisionInfo) according to the RACH configuration broadcasted from the same DL carrier that had broadcasted the PRACH configuration from which the PRACH resource used for the initial preamble transmission was chosen 1110. Alternatively or additionally, the WTRU may be provided with a fixed (non carrier-dependent) set of RACH parameters 1112. This set of RACH parameters may be implicitly determined from the DL carrier corresponding to the PCell 1114 or may be obtained via dedicated signaling 1116.

Upon selecting a PRACH resource from the set of available PRACHs as described above, a WTRU may select a preamble. The WTRU may select a preamble according to the manner in which the WTRU selected a PRACH resource.

If the WTRU selected PRACH resources corresponding to a specific prach-ConfigIndex within the allowed set, the WTRU may select a preamble using RACH parameters in preambleInfo from the RACH configuration broadcasted on the same DL carrier that broadcasted the selected PRACH configuration, for example, as in LTE Release 8.

If a dedicated preamble is provided by the network, the WTRU may select a preamble using RACH parameters in preambleInfo from the RACH configuration broadcasted on the same DL carrier that broadcasted the selected PRACH configuration, for example, as in LTE Release 8.

If the WTRU selected the PRACH configuration(s) or prach-ConfigIndex for which it can utilize a PRACH resource earliest among the available PRACH resources, the WTRU may select a preamble after the PRACH resources are determined. Optionally, the WTRU may then use the RACH parameters in preambleInfo from the RACH configuration broadcasted on the same DL carrier that broadcasted the PRACH configuration from which the PRACH resource was selected.

Alternatively or additionally, the WTRU may select a preamble in advance based on a preambleInfo set of parameters that may be provided by the network in a dedicated manner. Alternatively or additionally, the WTRU may select the preambleInfo set of parameters, among the set of DL carriers broadcasting the available PRACH resources, for which numberOfRA-Preambles is the smallest.

Employing carrier aggregation in wireless communications may allow the RACH delay to be reduced via simultaneous transmission of multiple random access preambles within a given RACH period. A WTRU may send simultaneous random access preambles on multiple or all of the $N_{UL}$ CCs. The transmitted preambles may be the same or may be different. This may reduce delay if there is contention on the UL channel or heavy DL traffic because other CCs may be in a better position to provide PUSCH resources for a msg3 transmission.

Figure 12:
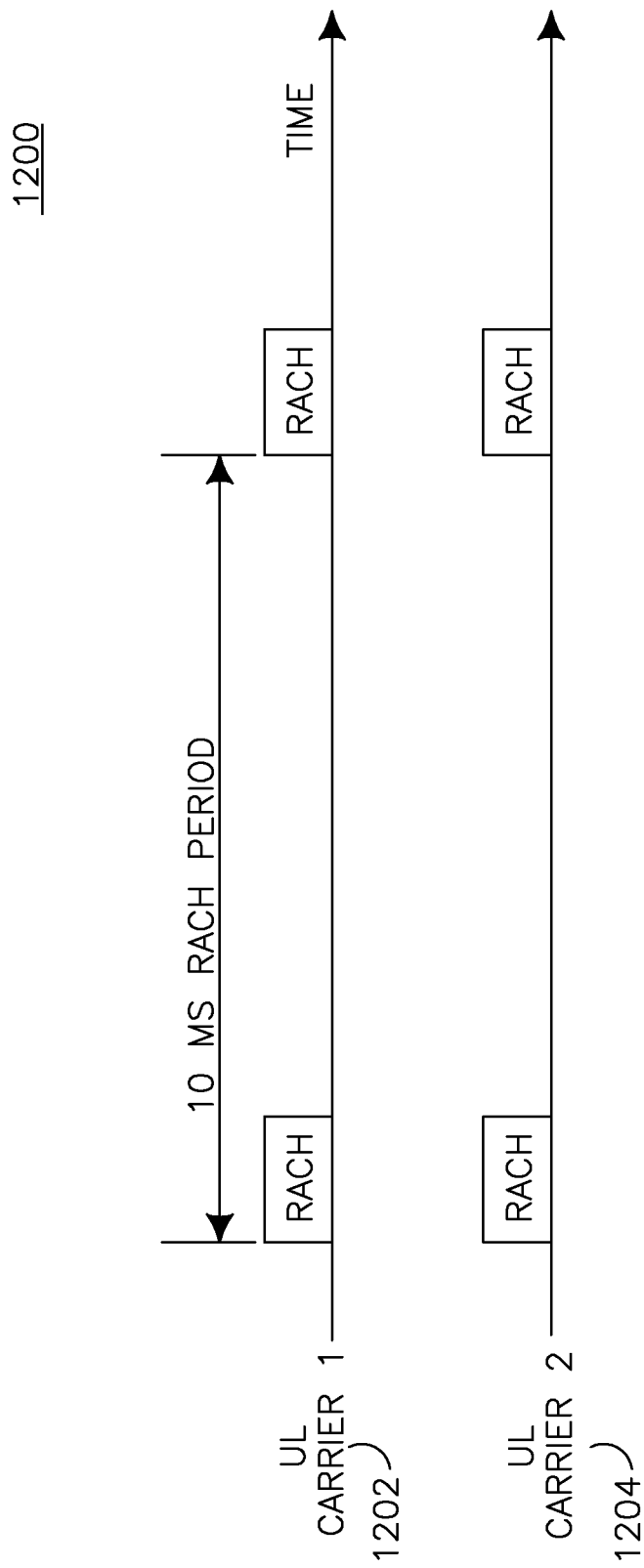
FIG. 12 shows an example of transmission of simultaneous RACH requests.

FIG. 12 shows an example of transmission of simultaneous RACH requests 1200, including a first UL carrier (UL carrier 1) 1202 and a second UL carrier (UL carrier 2) 1204. A random access preamble is sent on UL Carrier 1 1202 and UL Carrier 2 1202 simultaneously. At least one of the sent preambles may be detected. An eNB may send back one random access response (RAR).

Figure 13:
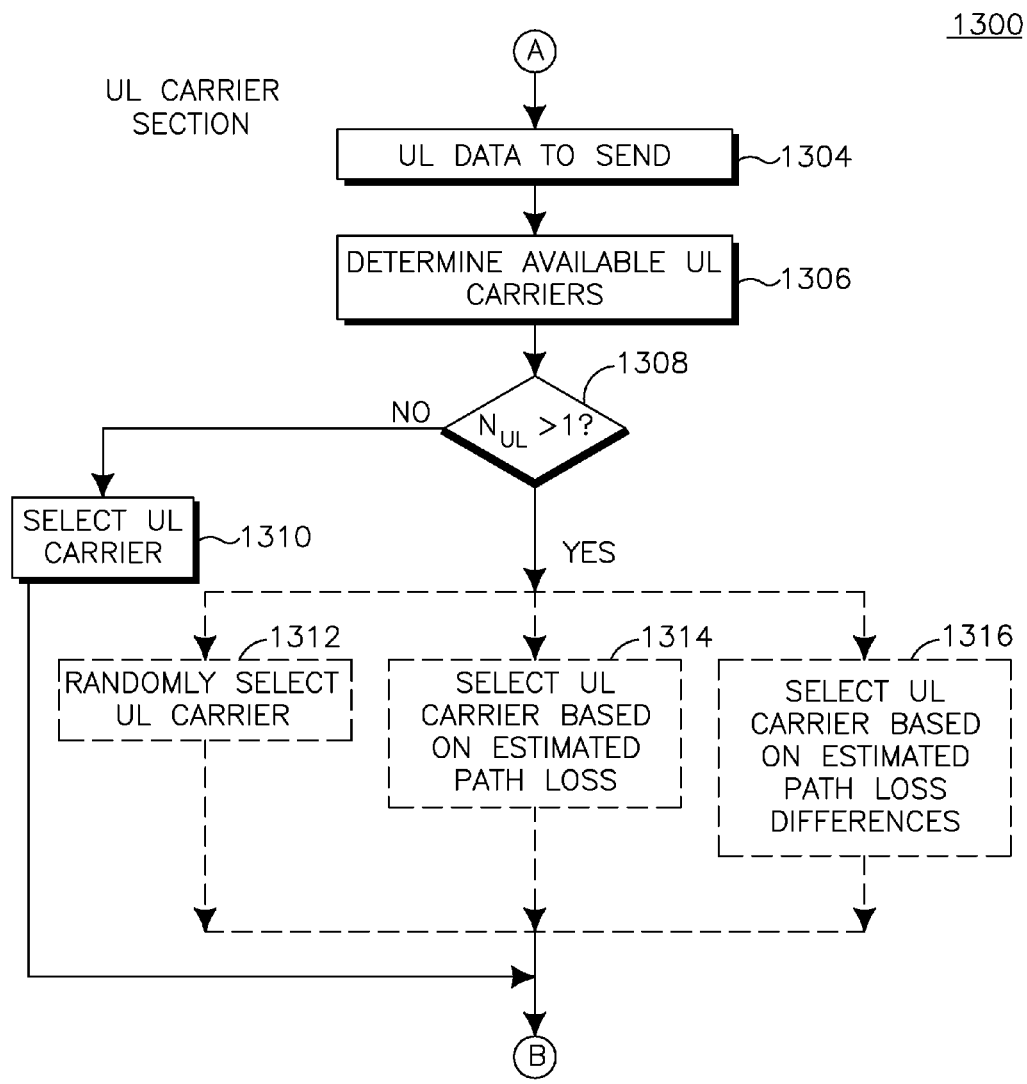
FIG. 13 shows an example procedure for determining available UL carriers.

FIG. 13 shows an example procedure 1300 for determining available UL carriers. A WTRU may have UL data to send 1304 and may need to determine available UL carriers 1306. If the number of UL carriers, $N_{UL}$, is not greater than 1 1308, the WTRU may select, if possible, the one UL carrier that is available 1310. If $N_{UL}$ is greater than 1 1308, the WTRU may randomly select an UL carrier 1312 within the configured set of UL CCs (for example, PRACH resources). As an example, the WTRU may perform the selection using a uniform probability mass function or an arbitrary probability mass function. An arbitrary probability mass function may be signaled from the system information acquired on the DL carrier(s) or may be derived from UL load information broadcasted on the DL carrier(s).

Alternatively, if the number of UL carriers, $N_{UL}$, is greater than 1 1308, the WTRU may select an UL carrier based on estimated path loss 1314 to the eNB. For example, if there are two UL carriers, the WTRU may select a first UL carrier on a condition that the path loss is below a predetermined threshold and a second UL carrier on a condition that the path loss is above the predetermined threshold. Generally, a set of $N_{UL}-1$ thresholds ($T_i$) may be used for $N_{UL}$ UL carriers, where UL carrier #i may be selected if $T_{(i-1)}<$path loss$<T_i$. The frequencies of the UL carriers may not need to increase with i. The thresholds $T_i$ used for comparison may depend on the preamble group (which is also dependent on the path loss), thus possibly providing a finer granularity of path loss information. Alternatively, the thresholds used for the preamble group determination may be dependent on the choice of the UL carrier. The thresholds may be signaled as part of system information.

If the different DL and UL carriers are in different frequency bands, there may be a significant difference of path loss between the carriers that are in different bands. To address this difference, the path loss may be measured on a specific DL carrier (or any DL carrier on a specific frequency band) that is signaled by system information. Second, the path loss may be measured on any DL carrier. The WTRU may apply a compensation offset or factor to the path loss estimate, which may depend on the frequency band. The offset may be pre-defined or may be signaled from system information.

Alternatively, if the number of UL carriers, $N_{UL}$, is greater than 1 1308, the WTRU may select a UL carrier based on the difference between the estimated path loss to the serving cell (for example, an eNB) and the estimated path loss to a neighboring cell 1316. The neighboring eNB or cell may be the next strongest eNB or cell, or may be signaled from system information. For example, on a condition that there are two UL carriers, the WTRU may select one UL carrier on a condition that the path loss difference is below a predetermined threshold and the other UL carrier on a condition that the path loss difference is above the threshold. Generally, a set of $N_{UL}-1$ thresholds $T_i$ may be used in the case of $N_{UL}$ UL carriers, where UL carrier #i is selected if $T_{(i-1)}<$path loss difference$<T_i$. The frequencies of the UL carriers may not need to increase with i. This may allow the WTRU to quickly indicate to the network whether some resource blocks used in some neighboring cells may be used or may not be used for the accessing the WTRU while considering interference.

Figure 14:
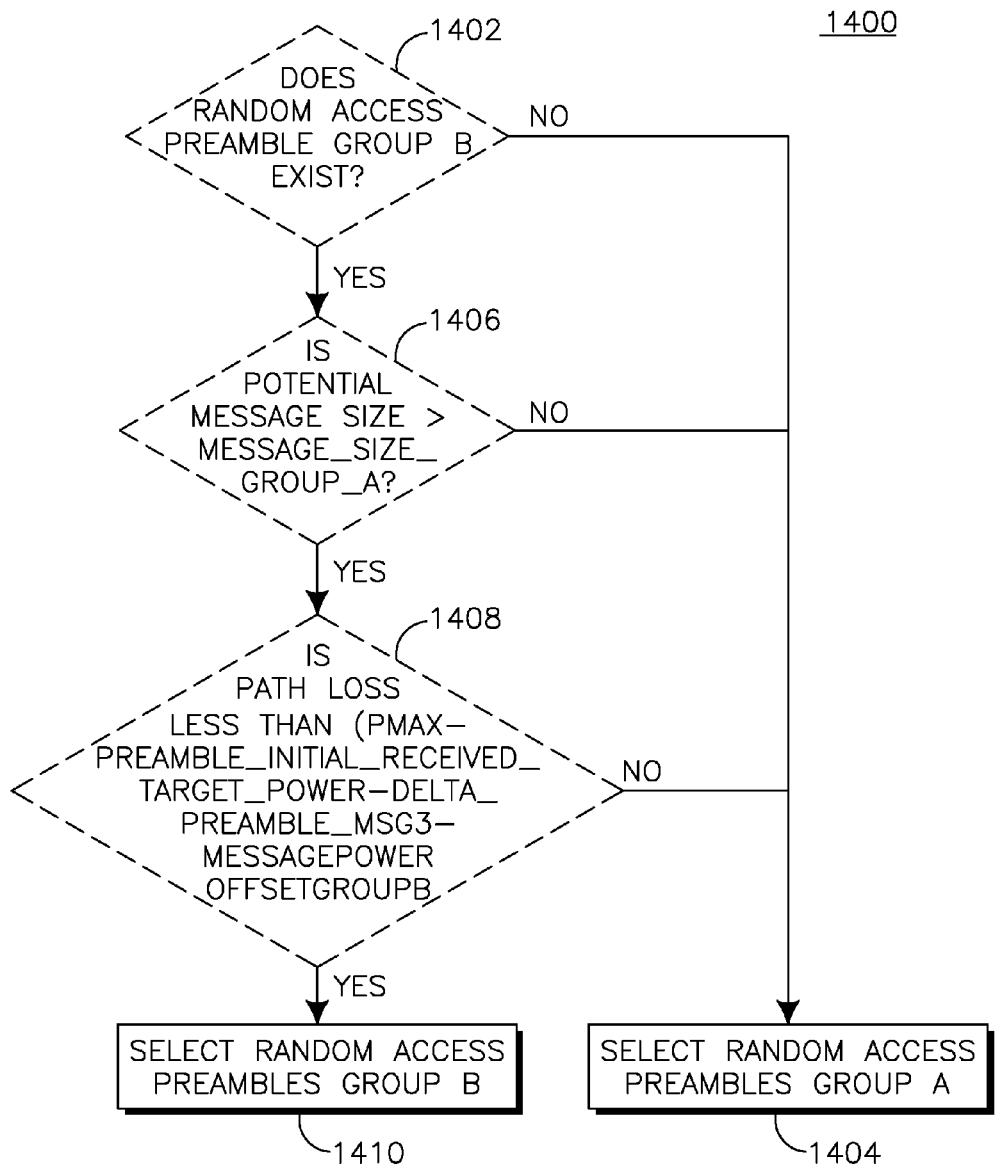
FIG. 14 shows an example of a procedure demonstrating RA preambles group B selection criteria.

A WTRU may select RA preambles group A or RA preambles group B for preamble transmission based on certain criteria. RA preambles group A may be a group that is already configured. RA preambles group B, if available, may be used to indicate to the network that the WTRU has a message larger than a given value or may indicate that the WTRU is power-limited. This may enable the eNB to provide a grant based on the WTRU's location or distance within a cell. FIG. 14 shows an example of a procedure 1400 demonstrating RA preambles group B selection criteria. RA preambles group B may be selected provided that: (1) RA preambles group B exists; (2) potential message size is greater than MESSAGE_SIZE_GROUP_A; and (3) path loss (L) meets the inequality:

$$L < P\text{max} - \text{PREAMBLE\_INITIAL\_RECEIVED\_TARGET\_POWER} - \text{DELTA\_PREAMBLE\_MSG3} - \text{messagePowerOffsetGroup}B \quad \text{(Equation 1)}$$

The potential message size may be data available for transmission plus an AMC header and, where required, MAC control elements. If the above criteria are not met, RA preambles group A may be selected.

Referring to FIG. 14, if RA preambles group B does not exist 1402, RA preambles group A is selected 1404. If RA preambles group B does exist 1402, but potential message size is not greater than MESSAGE_SIZE_GROUP_A 1406, RA preambles group A is selected 1404. If RA preambles group B does exist 1402 and the potential message size is greater than MESSAGE_SIZE_GROUP_A 1406, but path loss is not less than the quantity defined by Equation 1 1408, RA preambles group A is selected 1404. If RA preambles group B does exist 1402, the potential message size is greater than MESSAGE_SIZE_GROUP_A 1406, and path loss is less the quantity defined by Equation 1 1408, RA preambles group B is selected step 1410.

Figure 15:
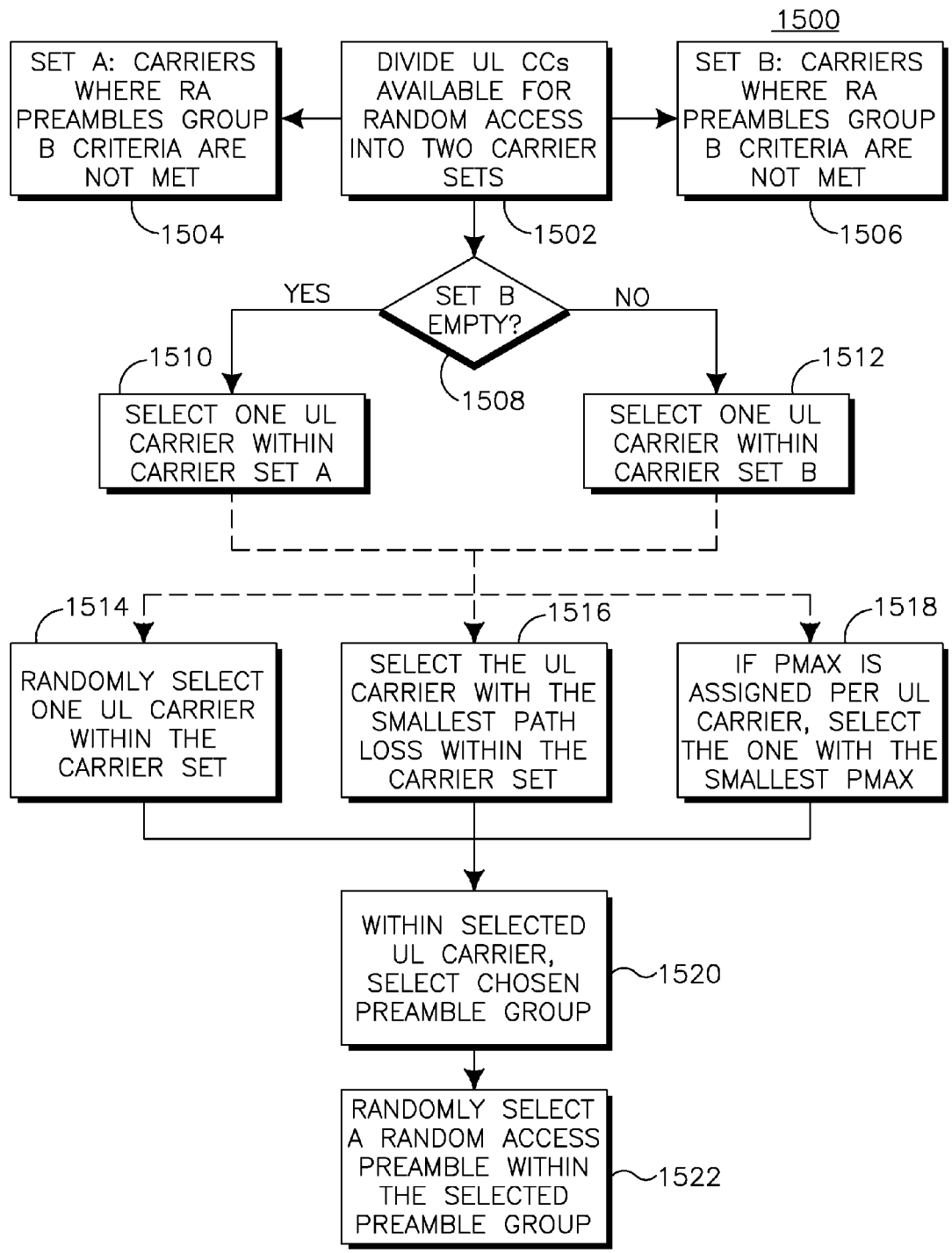
FIG. 15 shows an example procedure of initial RA transmission.

Using the defined RA preambles group B criteria, a WTRU may use one or a combination of the following embodiments to select a RA preamble among multiple UL CCs available for RA. FIG. 15 shows an example procedure 1500 of initial RA transmission. The WTRU may divide UL CCs available for random access into two carrier sets 1502. Carrier Set A may include carriers in which RA preambles group B criteria are not met 1504. Carrier Set B may include carriers in which RA preambles group B criteria are met 1506. On a condition that Set B is empty 1508, one UL carrier within Carrier Set A may be selected 1510. On a condition that Set B is non-empty 1508, one UL carrier within Carrier Set B may be selected 1512. The WTRU may then select an UL CC within the chosen set in one or a plurality of ways. The WTRU may randomly select one UL carrier within the carrier set 1514. Alternatively, the WTRU may select the UL carrier with the smallest path loss within the carrier set 1516. Alternatively, if Pmax is assigned per UL carrier, the WTRU may select the UL carrier with the smallest Pmax 1518. Having selected the UL carrier, the WTRU may select the preamble group chosen in the preceding steps 1520. The WTRU may then randomly select a RA preamble within the selected preamble group 1522.

A random access retransmission may include retransmitting an UL message containing the C-RNTI MAC control element or the UL message including the common control channel (CCCH) service data unit (SDU). The same random access preamble group (A or B) as was chosen for the earlier preamble transmission attempt may be selected. For the retransmission, the preamble may be sent on a different UL carrier. The UL carrier may be chosen as in element 1514, element 1516, or element 1518. A random access preamble may be randomly selected within the selected preamble group.

Figure 16:
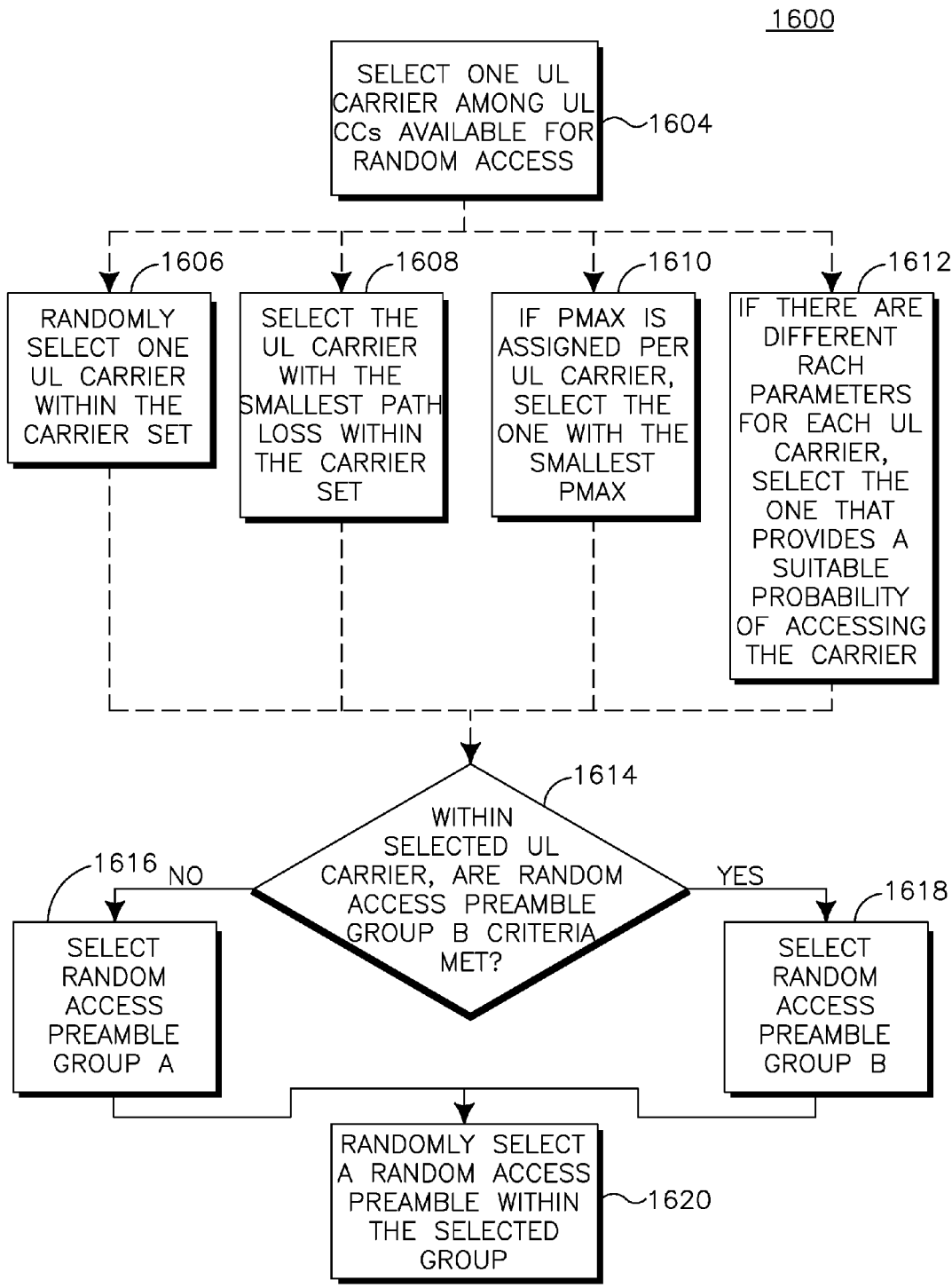
FIG. 16 shows an example procedure of initial RA transmission.

FIG. 16 shows an example procedure 1600 of initial RA transmission. The WTRU may select one UL carrier among UL CCs available for RA 1604. The UL carrier may be selected in one of a plurality of ways. The WTRU may randomly select one UL carrier within the carrier set 1606. Alternatively, the WTRU may select the UL carrier with the smallest path loss within the carrier set 1608. Alternatively, if Pmax is assigned per UL carrier, the WTRU may select the UL carrier with the smallest Pmax. Alternatively, if there are different RACH parameters for each UL carrier, the WTRU may select the UL carrier that provides the highest probability of accessing the carrier 1612. In another alternative, the WTRU may select the UL carrier that provides a suitable probability of accessing the carrier. For example, the probability may be a function of at least one of: (1) whether or not previous attempts were successful for a given UL CC/PRACH resource; (2) the number of preamble retransmissions for a given UL CC/PRACH resource; (3) the presence of RA preambles group B for a given UL CC/PRACH resource; or (4) the available transmit power based on Pmax and the path loss of the associated DL CC.

The selection criteria for element 1612 may include (1) the access class probability factor that allows the highest probability of random access success or that provides a suitable probability of accessing the carrier; (2) the UL carrier that allows a greater number of hybrid automatic repeat request (HARQ) msg3 transmissions; (3) the UL carrier that allows a greater offset between preamble and msg3; (4) the UL carrier that allows a highest Pmax, such that the WTRU may have a greater chance of succeeding and selecting RA preambles from group B; or (5) other parameters such as, for example, a delta preamble that may allow the WTRU to select RA preambles from a particular group.

Upon selecting the UL carrier, the WTRU may determine whether RA preambles group B criteria are met 1614. If RA preambles group B criteria are not met, the WTRU may select RA preambles group A 1616. On a condition that RA preambles group B criteria are met, the WTRU may select RA preambles group B 1618. The WTRU may then randomly select a RA preamble within the selected group 1620.

A random access retransmission may include retransmitting an UL message containing the C-RNTI MAC control element or the UL message including the CCCH SDU. The WTRU may select the same UL carrier that was used for the first preamble transmission. Within the same UL carrier, the same random access preamble group (A or B) as was chosen for the earlier preamble transmission attempt may be selected. A random access preamble may be randomly selected within the selected preamble group.

Alternatively or additionally, a WTRU may perform a retransmission by randomly selecting one UL carrier within the same carrier set used for the preamble transmission attempt corresponding to the first transmission. Within the selected UL carrier, the same random access preamble group (A or B) as was chosen for the earlier preamble transmission attempt may be selected. A random access preamble may be randomly selected within the selected preamble group.

Alternatively or additionally, a WTRU may perform a retransmission by randomly selecting an UL carrier. Within the selected UL carrier, a random access preamble group may be selected according to element 1614, element 1616, or element 1618. A random access preamble may be randomly selected within the selected preamble group.

Alternatively or additionally, a WTRU may perform a retransmission by selecting a UL carrier in the same manner as in the initial selection. Depending on the conditions, a different UL carrier than the UL carrier selected for initial transmission may be selected.

Figure 17:
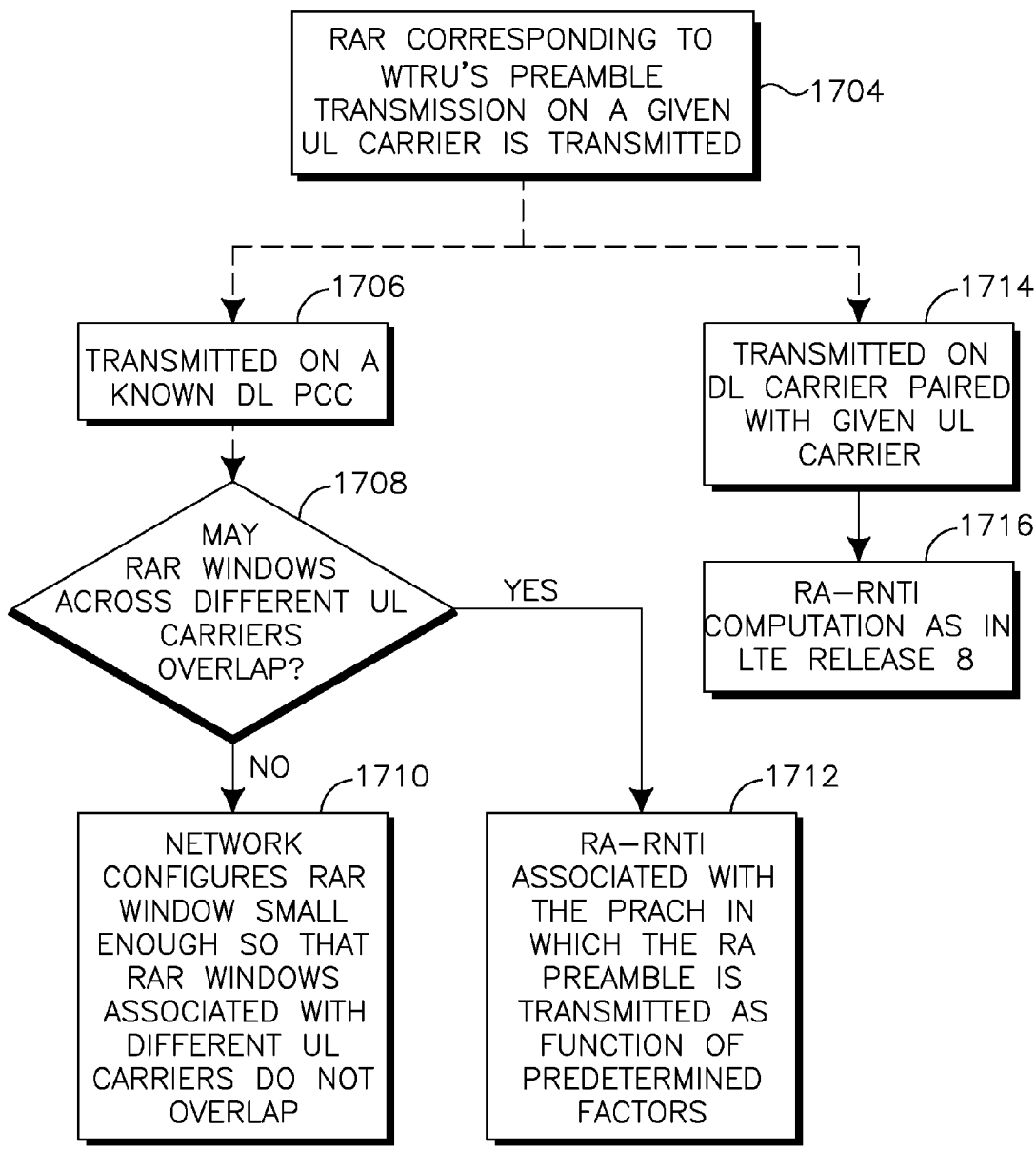
FIG. 17 shows an example of a procedure for transmitting a Random Access Response (RAR) corresponding to a WTRU's preamble transmission.

FIG. 17 shows an example of a procedure 1700 for transmitting a RAR corresponding to a WTRU's preamble transmission. A RAR corresponding to a WTRU's preamble transmission on a given UL carrier 1704 may be transmitted on a known DL PCC 1706 or transmitted on the DL carrier paired with the given UL carrier 1714. If the RAR is transmitted on a known DL PCC carrier 1706 and RAR windows across different UL carriers may not overlap 1708, RAR windows (for example, ResponseWindowSize) may be configured small enough so that RAR windows associated with different UL carriers do not overlap 1710. This may be demonstrated as ra-ResponseWindowSize≤reduced_RACH_period (for example, $T_{RACH}/N_{UL}$). Thus, the RA-RNTI computation in LTE-A may be kept the same as in LTE, such that:

$$RA\text{-}RNTI = 1 + t\_id + 10 * f\_id \qquad \text{(Equation 2)}$$

where t_id may be the index of the first subframe of the specified PRACH (0≤t_id<10) and f_id may be the index of the specified PRACH within that subframe, in ascending order of frequency domain (0≤f_id<6).

Alternatively, if the RAR is transmitted on a known DL PCC 1706 and RAR windows on different UL carriers may overlap 1708, the RA-RNTI associated with the PRACH in which the RA preamble is transmitted may be computed as a function of t_id, f_id, and carrier_id 1712, such that:

$$RA\text{-}RNTI = f(t\_id, f\_id, carrier\_d) \qquad \text{(Equation 3)}$$

where carrier_id is the index of the UL carrier on which a RA preamble is transmitted and whose RAR is mapped on the DL PCC (1<carrier_id≤N). An example of function f( ) may be given as:

$$RA\text{-}RNTI = f(t\_id, f\_id, carrier\_id) = 1 + carrier\_id * (t\_id + 10 * f\_id) \qquad \text{(Equation 4)}$$

In this formula, the carrier_id of the UL carrier that is paired with the DL PCC, as signaled in SIB2, should be equal to 1. Thus, backward compatibility with other WTRUs may be maintained because RA-RNTI is 1+t_id+10*f_id. Another example of function f( ) may be given as:

$$RA\text{-}RNTI = f(t\_id, f\_id, carrier\_id) = (carrier\_id - 1) * (t\_id + 10 * f\_id) \qquad \text{(Equation 5)}$$

In another embodiment, the RAR corresponding to the WTRU's preamble transmission may be transmitted on the DL carrier paired with the given UL carrier 1714. In this embodiment, the RA-RNTI computation may be performed in the same manner as in LTE Release 8 1716.

Table 1 shows an example of RNTI values. Allocation of RNTI values may increase the range for RA-RNTI. For example, Value1$_{FDD}$ may equal $(N_{max}*10)-1$ and Value1$_{TDD}$ may equal $(N_{max}*60)-1$, where $N_{max}$ may be the maximum number of UL CCs whose RARs are mapped on the same DL carrier.

TABLE 1

| Value (hexa-decimal) | | |
|---|---|---|
| FDD | TDD | RNTI |
| 0000-Value1$_{FDD}$ | 0000-Value1$_{TDD}$ | RA-RNTI |
| Value1$_{FDD}$ + 1 – Value2 | Value1$_{TDD}$ + 1 – Value2 | C-RNTI, Semi-Persistent Scheduling C-RNTI, Temporary C-RNTI, Transmit Power Control (TPC)-PUCCH-RNTI and TPC-PUSCH-RNTI |
| | Value2 + 1 – FFFD | Reserved for future use |
| | FFFE | Paging (P)-RNTI |
| | FFFF | System Information (SI)-RNTI |

RACH delay may be reduced via joint processing of the RACH request while employing carrier aggregation in wireless communications. The eNB may detect a RA preamble on one UL carrier. The eNB may schedule RACH msg3 transmission on any one of the $N_{UL}$, UL carriers. A WTRU may follow the grant received in the RAR, which may provide PUSCH resources on a different UL than the preamble was sent on.

Figure 18:
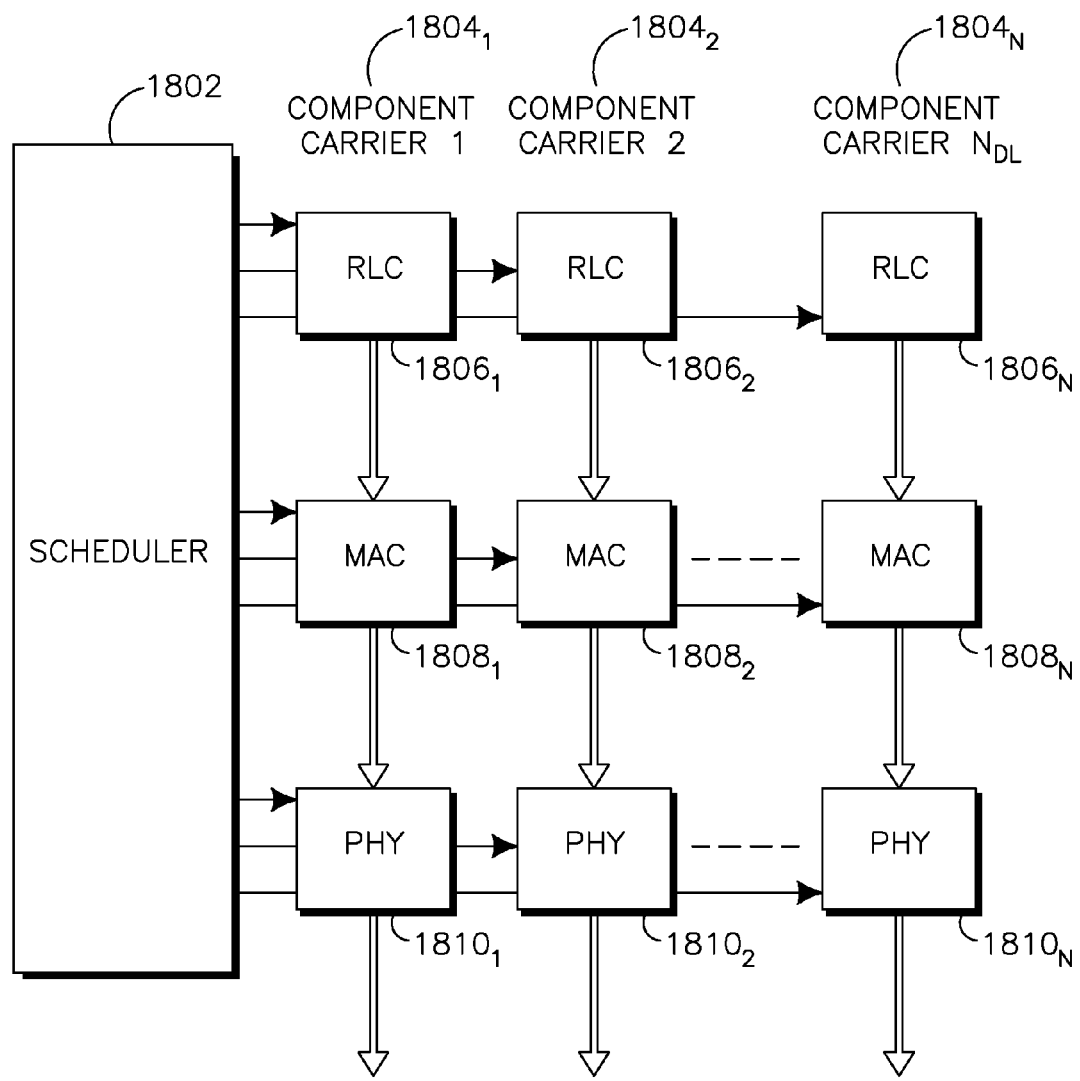
FIG. 18 shows an overview of joint processing of a RACH request.

FIG. 18 shows an overview of joint processing of a RACH request at an eNB, including a scheduler 1802 and multiple component carriers 1804$_a$-1804$_n$. Each component carrier 1804$_a$-1804$_n$ may include a RLC layer 1806$_a$-1806$_n$, a MAC layer 1808$_a$-1808$_n$, and a PHY layer 1808$_a$-1808$_n$. When a WTRU request is received at the scheduler 1802, the eNB may respond to the request by considering the capacity of all component carriers 1804$_a$-1804$_n$ rather than considering only the resource availability of the CC that initiated the RA procedure. Upon detection of a first RACH preamble received on any UL CC 1804a-1804n, the eNB may check the resource usage status and load of all available UL CCs 1804$_a$-1804$_n$. The eNB may then respond to the WTRU's RA preamble (for example, a request for PUSCH allocation for a RACH msg3) by scheduling PUSCH on any available UL CC 1804a-1804n.

In this manner, the assigned UL CC 1804a-1804n may or may not be the same as the CC 1804a-1804n that the WTRU transmitted its RACH transmission on.

Figure 19:
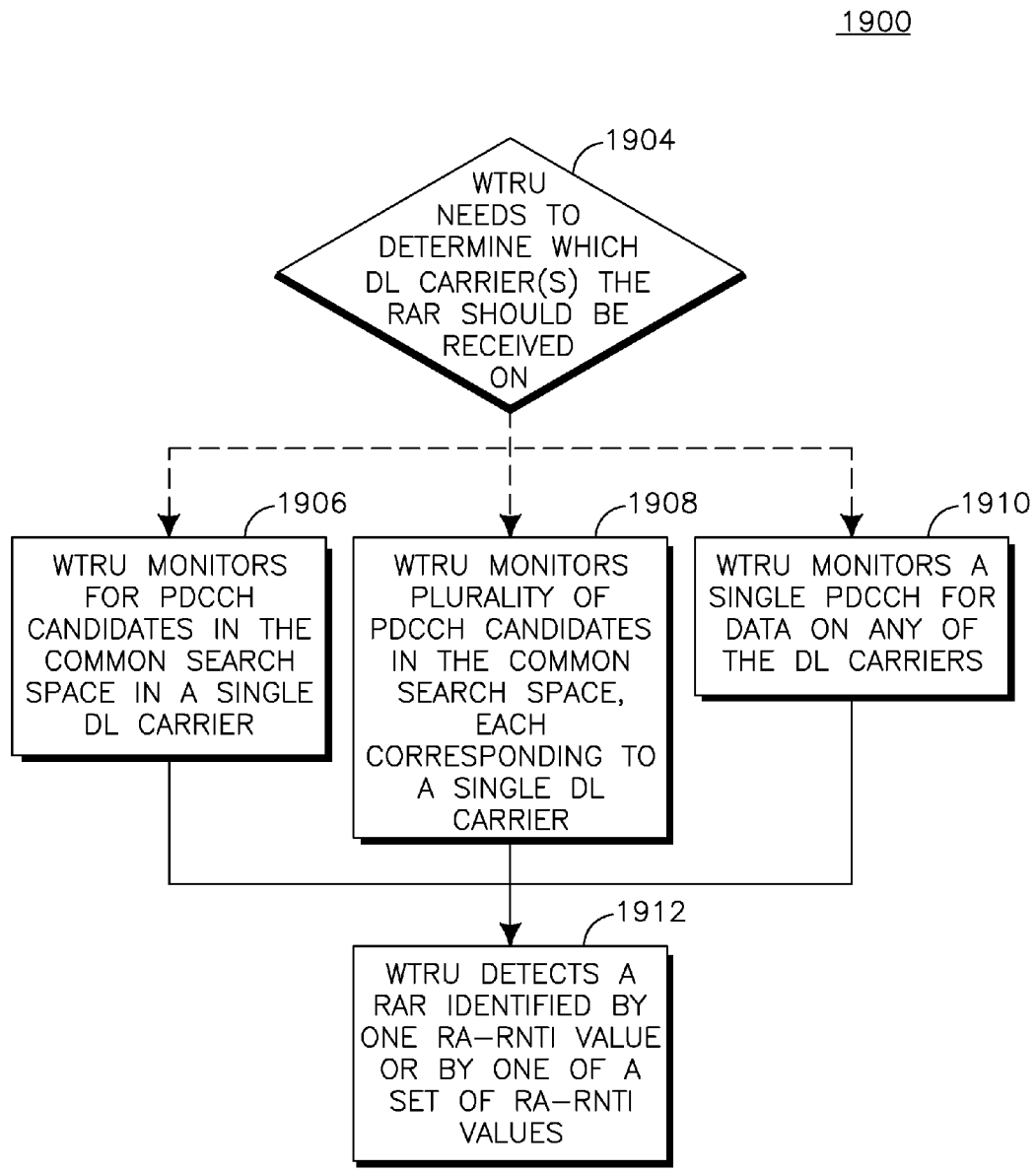

FIG. 19 shows an example of a procedure 1900 for determining which DL carrier the RAR may be received on. A WTRU may need to determine which DL carrier(s) the RAR may be received on 1904 and may do so, for example, according to one or a combination of the following embodiments. In one embodiment, a WTRU may monitor for PDCCH candidates in the common search space on a single DL carrier 1906, assuming that PDCCH is defined on a per-carrier basis. The DL carrier may be a function of the UL carrier used for preamble transmission. Alternatively, the DL carrier may be a function of the preamble that was transmitted. For example, the DL carrier may depend on which preamble group the transmitted preamble belongs to. Alternatively, the DL carrier may be a function of a combination of the two previous alternatives, based on both the UL carrier used for preamble transmission and the transmitted preamble. The PDCCH may be received from a PCC indicated from system information, or it may be received on the same DL carrier on which the data part is to be received. Alternatively, the WTRU may monitor for PDCCH candidates in the common search space of the WTRU-specific PCC while in connected mode. The WTRU-specific PCC may be assigned by the network in a RRC message upon the WTRU entering Connected mode.

In another embodiment, a WTRU may monitor a plurality of PDCCH candidates in the common search space, each corresponding to a single DL carrier 1908, assuming that PDCCH is defined on a per-carrier basis. The DL carriers may be a function of the UL carrier used for preamble transmission. Alternatively, the DL carriers may be a function of the transmitted preamble. For example, the DL carriers may depend on which preamble group the transmitted preamble belongs to. Alternatively, the DL carriers may be a function of a combination of the two previous alternatives, based on both the UL carrier used for preamble transmission and the transmitted preamble. The PDCCHs may be received on a PCC indicated from system information, or they may be received on the respective DL carriers on which the data part is to be received.

In another embodiment, the WTRU may monitor a single PDCCH for data on any of the DL carriers 1910. The PDCCH may be received on a PCC indicated from system information, or it may be received on a DL carrier that is a function of either the UL carrier used for preamble transmission, the transmitted preamble, or a combination of both. The DL carrier on which the data part (PDSCH) is received may also be a function of either the UL carrier used for preamble transmission, the transmitted preamble, or a combination of both. Alternatively, the DL carrier on which the data part is to be received may be indicated by the contents of the PDCCH or by the RA-RNTI used to mask the PDCCH.

The monitoring described in the above embodiments (element 1906 through element 1910), may also include a WTRU detecting a RAR identified by one RA-RNTI value or by one of a set of RA-RNTI values 1912. The one RA-RNTI value or the set of RA-RNTI values may be determined from a combination of the t_id and f_id parameters plus one or a combination of the UL carriers used for preamble transmission, the DL carrier used for PDCCH transmission of the RAR, and/or the DL carrier used for PDSCH transmission of the RAR.

Figure 20:
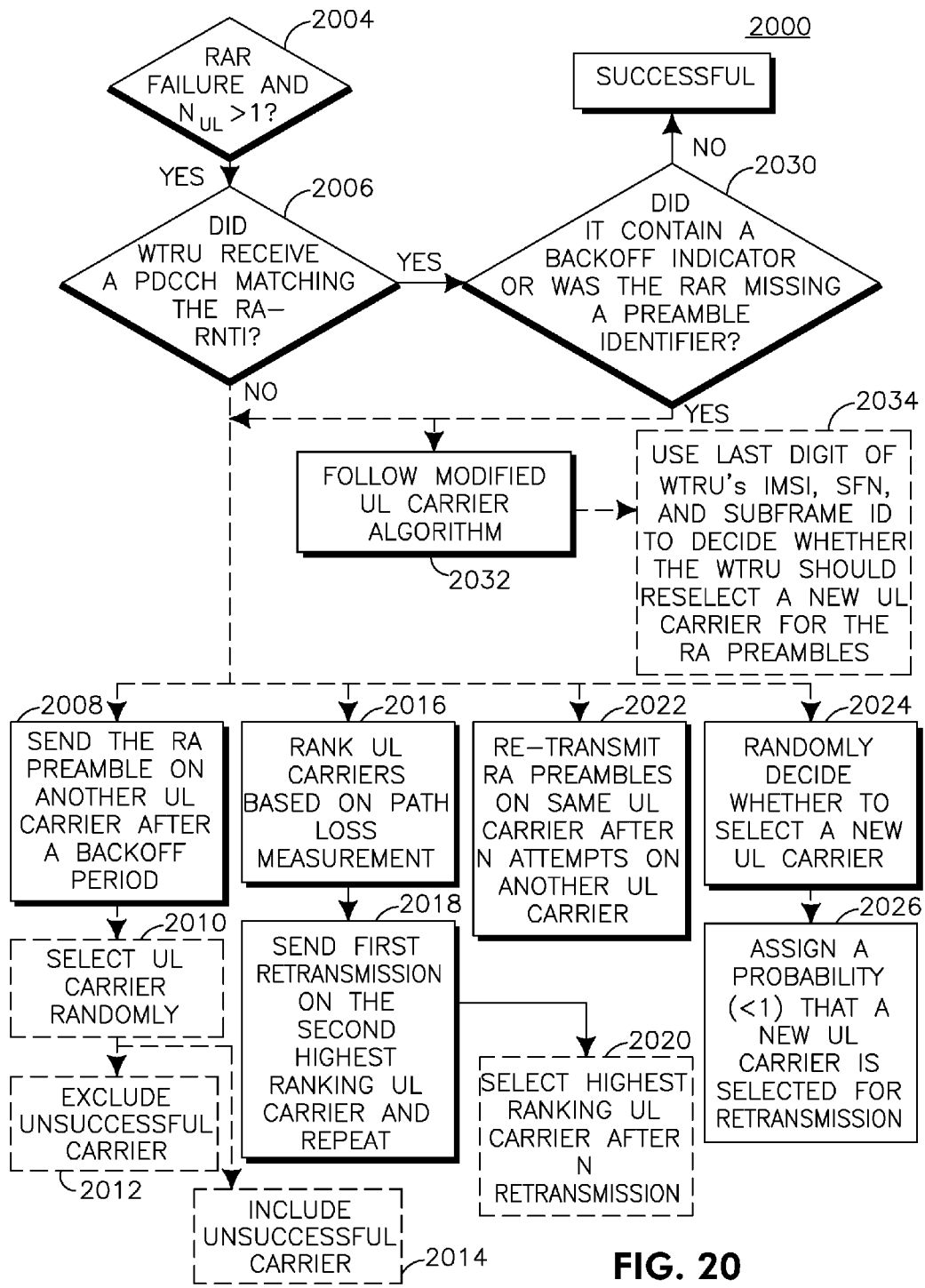
FIG. 20 shows an example of a procedure for preamble retransmission.

FIG. 20 shows an example of a procedure 2000 for preamble retransmission. A WTRU may determine that a RAR failure has occurred and may select one or a plurality of UL carriers to be used for retransmission of the RA preamble. If a WTRU determines that a RAR failure has occurred and the number of UL carriers is greater than 1 2004, the WTRU may then determine whether a PDCCH matching the RA-RNTI was received 2006.

If no PDCCH matching the RA-RNTI was received 2006 during the RA window interval, the WTRU may then select one or a plurality of UL carriers for retransmission of the RA preamble according to one or a combination of the following embodiments. In one embodiment, the WTRU may send the RA preamble on another UL carrier after a backoff period 2008. Optionally, the WTRU may select the UL carrier randomly 2010. During random selection of the UL carrier, the WTRU may exclude the unsuccessful carrier from the potential carriers 2012 or include the unsuccessful carrier in the potential carriers 2014. Optionally, the power ramp scheme used for the RA preamble may be implemented as well. Alternatively, the WTRU may use any of the alternatives described above regarding PRACH resource selection.

In another embodiment, UL carriers may be ranked based on a path loss measurement 2016 as described above. The WTRU may send the first retransmission on the second highest ranking UL carrier 2018. This process may be repeated and the WTRU may send the second retransmission on the third highest ranking UL carrier, and so on. Optionally, after a predetermined number of RA preamble retransmissions, the WTRU may re-select the highest ranking UL carrier 2020.

In another embodiment, the WTRU may retransmit on the same UL carrier for a predetermined number of transmissions before selecting a new UL carrier 2022.

In another embodiment, the WTRU may randomly decide whether to select a new UL carrier 2024. Optionally, the WTRU may assign a probability (less than 1) that a new UL carrier is selected 2026.

If a PDCCH matching the RA-RNTI was received 2006, the WTRU may determine whether the PDCCH contains a backoff indicator or whether the RAR is missing a preamble identifier 2030. If the PDCCH contains a backoff indicator or the RAR is missing a preamble identifier, the WTRU may select a UL carrier according to the embodiments described above (element 2008 through element 2026) or the WTRU may follow a modified UL carrier algorithm 2032. An example of a modified UL carrier algorithm may be using the last digit of the WTRU's IMSI, the SFN, and the subframe ID to decide whether the WTRU should reselect a new UL carrier for the RA preambles 2034.

Once a WTRU has detected a RAR on one of the DL carriers, the WTRU may then select an UL carrier on which the next message (for example, msg3) may be transmitted. In one embodiment, the WTRU may transmit the next message on the same UL carrier that is used for preamble transmission. In another embodiment, the UL carrier (and optionally a transmit power adjustment) may be determined based on the contents of the RAR that was received. In another embodiment, the UL carrier may be determined based on the DL carrier of the PDCCH used for the RAR scheduling. In another embodiment, the UL carrier may be determined based on the DL carrier from which the data part (for example, PDSCH) of the RAR was received.

The WTRU may then determine the DL carrier over which the next message (for example, msg4) may be received. In one embodiment, the DL carrier may be determined as the same DL carrier(s) of the PDCCH used for RAR scheduling. In another embodiment, the DL carrier may be determined as the same DL carrier(s) of the PDSCH used for RAR reception. In another embodiment, each of the previous two embodiments may be used, determining the DL carrier based on the DL carrier(s) of the PDCCH used for RAR scheduling as well as the DL carrier(s) of the PDSCH used for RAR reception. In another embodiment, the DL carrier may be determined based on the contents of the RAR.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) operable to perform a random access procedure, the WTRU comprising:
   circuitry configured to receive a physical downlink control channel (PDCCH) order, wherein the PDCCH order includes a carrier indicator field (CIF);
   the circuitry is further configured in response to the PDCCH order to transmit a random access preamble on a component carrier, selected from a plurality of component carriers, the component carrier indicated by the CIF, wherein the component carrier indicated by the CIF is a member of a group of component carriers of the plurality of component carriers, and further wherein the group of component carriers have a same timing alignment (TA);
   the circuitry is further configured to receive a random access response (RAR) on a primary downlink component carrier in response to the random access preamble, wherein the RAR includes a timing advance; and
   the circuitry is further configured to use the timing advance to adjust uplink transmission timing via any component carrier of the group of component carriers.

2. The WTRU of claim 1, wherein the PDCCH order is received in downlink control information (DCI) format 1a.

3. The WTRU of claim 2, wherein the DCI format 1a includes a preamble index and the random access preamble transmission is performed in accordance with the preamble index.

4. The WTRU of claim 3, wherein the circuitry is further configured to receive the preamble index with a value "000000", and in response, select the preamble randomly.

5. The WTRU of claim 1, wherein the circuitry is further configured to receive random access channel configuration information for a plurality of component carriers.

6. The WTRU of claim 5, wherein the circuitry is further configured to receive information indicating that a component carrier is to be added.

7. The WTRU of claim 1, wherein the circuitry is further configured to receive the PDCCH order via a first component carrier associated with a first cell; and
   wherein the circuitry is further configured to transmit the random access preamble via a second component carrier associated with a second cell.

8. The WTRU of claim 1, wherein the circuitry is further Configured to use the timing advance to adjust timing of a physical uplink shared Channel (PUSCH) transmission via any component carrier of the group of Components carriers.

9. The WTRU of claim 1, wherein the circuitry is further configured to receive transmissions via the primary downlink component carrier and one or more secondary component carriers, wherein the RAR is always received via the primary downlink component carrier.

10. A method of performing random access by a wireless transmit/receive unit (WTRU), the method comprising:

receiving, by the WTRU, a physical downlink control channel (PDCCH) order, wherein the PDCCH order includes a carrier indicator field (CIF);

in response to the PDCCH order, transmitting, by the WTRU, a random access preamble on a component carrier, selected from a plurality of component carriers, the component carrier indicated by the CIF, wherein the component carrier indicated by the CIF is a member of a group of component carriers of the plurality of component carriers, and further wherein the group of component carriers have a same timing alignment (TA);

receiving, by the WTRU, a random access response (RAR) on a primary downlink component carrier in response to transmitting the random access preamble, wherein the RAR includes a timing advance; and using, by the WTRU, the timing advance to adjust uplink transmission timing via any component carrier of the group of component carriers.

11. The method of claim 10 wherein the PDCCH order is received in downlink control information (DCI) format 1a.

12. The method of claim 11 wherein the DCI format 1a includes a preamble index and the random access preamble transmission is performed in accordance with the preamble index.

13. The method of claim 12 further comprising:
receiving "000000" for the preamble index; and
in response, selecting the preamble randomly.

14. The method of claim 10 further comprising receiving, by the WTRU, random access channel configuration information for a plurality of component carriers.

15. The method of claim 14 further comprising receiving, by the WTRU, information indicating that a component carrier is to be added.

16. The method of claim 10, further comprising:
receiving the PDCCH order via a first component carrier associated with a first cell; and
transmitting the random access preamble via a second component carrier associated with a second cell.

17. The method of claim 10, wherein the using includes using the timing advance to adjust timing of a physical uplink shared channel (PUSCH) transmission via any component carrier of the group of component carriers.

18. The method of claim 10, further comprising receiving transmissions via the primary downlink component carrier and one or more secondary component carriers, wherein the RAR is always received via the primary downlink component carrier.

19. An eNodeB comprising:
circuitry configured to transmit a physical downlink control channel (PDCCH) order for a random access procedure, wherein the PDCCH order includes a carrier indicator field (CIF) indicating a component carrier, selected from a plurality of component carriers, via which a wireless transmit/receive unit (WTRU) is to transmit a random access preamble, wherein the component carrier indicated by the CIF is a member of a group of component carriers of the plurality of component carriers, and further wherein the group of component carriers have a same timing alignment (TA);
the circuitry is further configured to receive the random access preamble on the component carrier indicated by the CIF in response to the PDCCH order;
the circuitry is further configured to transmit a random access response (RAR) on a primary downlink component carrier in response to the random access preamble, wherein the RAR includes a timing advance used to adjust uplink transmission timing via any component carrier of the group of component carriers.

20. The eNodeB of claim 19, wherein the circuitry is further configured to transmit the PDCCH order using downlink control information (DCI) format 1a.

21. The eNodeB of claim 20, wherein the DCI format 1a includes a preamble index and the received random access preamble is based on the preamble index.

22. The eNodeB of claim 21, wherein the circuitry is further configured to transmit "000000" as the preamble index; and
wherein the circuitry is further configured to receive a randomly selected preamble in response.

23. The eNodeB of claim 19, wherein the circuitry is further configured to transmit random access channel configuration information for a plurality of component carriers.

24. The eNodeB of claim 23, wherein the circuitry is further configured to transmit information indicating that a component carrier is to be added.

25. The eNodeB of claim 19, wherein the circuitry is further configured to receive a physical uplink shared channel (PUSCH) transmission adjusted by the timing advance via any component carrier of the group of component carriers.

26. The eNodeB of claim 19, wherein the circuitry is further configured to transmit transmissions via the primary downlink component carrier and one or more secondary component carriers, wherein the RAR is always transmitted via the primary downlink component carrier.

* * * * *